United States Patent [19]
Kozaki et al.

[11] Patent Number: 5,890,098
[45] Date of Patent: Mar. 30, 1999

[54] DEVICE AND METHOD FOR PERFORMING FAST FOURIER TRANSFORM USING A BUTTERFLY OPERATION

[75] Inventors: Yasunari Kozaki; Osamu Ito, both of Tokyo; Yasunari Ikeda, Kanagawa, all of Japan

[73] Assignee: Sony Corporation, Tokyo, Japan

[21] Appl. No.: 841,355

[22] Filed: Apr. 30, 1997

[30] Foreign Application Priority Data

Apr. 30, 1996 [JP] Japan ..................................... 8-109157
May 16, 1996 [JP] Japan ..................................... 8-121336

[51] Int. Cl.$^6$ .................................................... G06F 17/14
[52] U.S. Cl. .................. 702/77; 364/726.02; 364/726.07
[58] Field of Search .................................... 364/576, 726, 364/725, 726.02, 726.07; 702/77

[56] References Cited

PUBLICATIONS

Grajcar et al.; "The FFT butterfly operation in 4 processor cycles on a 24 bit fixed–point DSP with a pipelined multiplier.", IEEE International Conference on Acoustics, Speech, and Signal Processing. pp. 611–614, vol.. 1, of 5 Abstract only, Apr. 21, 1997.

*Primary Examiner*—Kamini S. Shah
*Attorney, Agent, or Firm*—Frommer Lawrence & Haug, LLP; William S. Frommer; Dennis M. Smid

[57] ABSTRACT

In order to carry out FFT operations at a high speed, a configuration is adopted where, while a FFT (fast Fourier transform) operation or inverse FFT (inverse fast Fourier transform) operation is being carried out by performing a prescribed number of butterfly operations with the output of a butterfly operator being fed-back to the input of the butterfly operator, at least one of: a first storage part for storing data inputted to the butterfly operator; a second storage part for temporarily storing data outputted from the butterfly operator and feeding-back read-out data to an input of the butterfly operator; and a third storage part, for storing data that has undergone a butterfly operation a prescribed number of times, has a storage part, with the storage part comprising a plurality of divided storage parts.

11 Claims, 18 Drawing Sheets

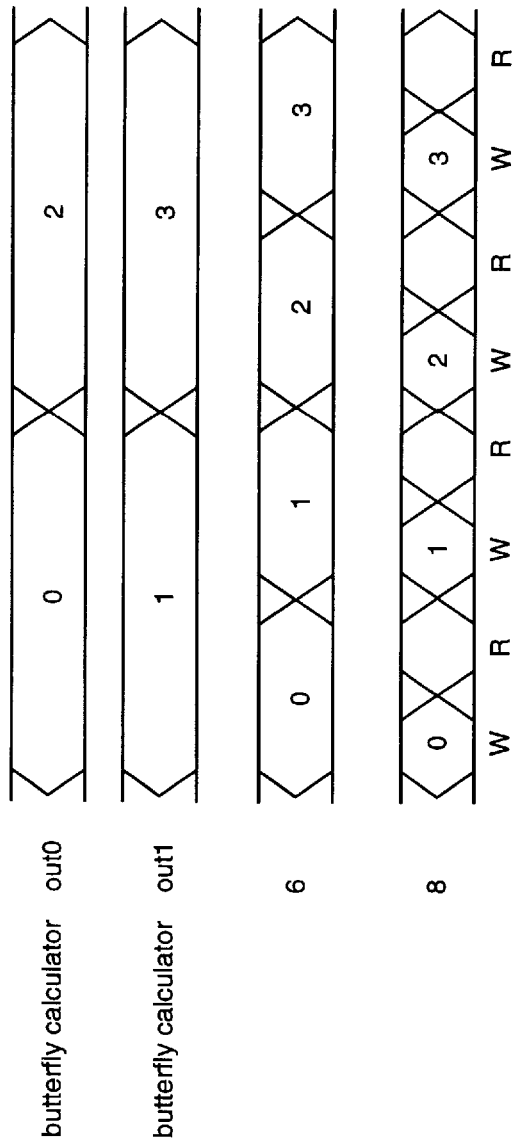

5,890,098

DEVICE AND METHOD FOR PERFORMING FAST FOURIER TRANSFORM USING A BUTTERFLY OPERATION

BACKGROUND OF THE INVENTION

The present invention relates to a fast Fourier transform operation device and method thereof, and more particularly relates to a fast Fourier transform operation device and method thereof capable of higher speeds.

Recently, digitization has become widespread in broadcast technology. FIG. 1 shows an example configuration of a receiving device for DAB (Digital Audio Broadcasting) that is one way of putting audio signals into digital form and then broadcasting digital radio broadcasts. Here, a tuner 102 received signals for a prescribed broadcast station (channel) from a signal received via an antenna 101 and outputs these signals to an A/D converter 103. The A/D converter 103 then converts the inputted signal from analog to digital. A "fast Fourier transform" (hereinafter abbreviated to "FFT") circuit 104 then performs FFT operations to convert from data on a time axis inputted by the A/D converter 103 to data for a plurality of sub-carrier waves on a frequency axis. This FFT circuit 104 is supplied with a symbol component after guard interval components provided between neighboring symbols on the time axis have been removed.

A de-interleaving and error correction circuit 105 performs de-interleaving and error correction processing on the output of the FFT circuit 104. Part of the signal that has been processed by the de-interleaving and error correction circuit 105 is then supplied to a decoder 106. This signal is then DQPSK (Differential Quadrature Phase Shift Keying) demodulated, with a left channel audio signal and a right channel audio signal then being outputted from speakers 107 and 108, respectively. An appended data output circuit 109 then separates and outputs appended data such as program contents and traffic information from the signal outputted by the de-interleaving and error correction circuit 105.

FIG. 2 shows an example configuration of this kind of related FFT circuit 104. In this example, inputted data is inputted to an input terminal in0 or in1 of a butterfly operator 4 via a selector 2 and a selector 3 after being temporarily stored in an input buffer 1. The butterfly operator 4 is an operator that perform butterfly operations (two point DFTs (Discrete Fourier Transforms)) of, for example, radix 2, reads rotational operator data (rotational factor) stored in a ROM 5 (Read Only Memory) as appropriate, performs butterfly operations on data inputted from terminal in0 and in1, and outputs this data to terminal out0 and out1.

The selector 6 selects data outputted from the terminals out0 and out1 of the butterfly operator 4 and outputs this data to a selector 7. The selector 7 then outputs data inputted from the selector 6 to a memory 8 or an output buffer 9. The memory 8 stores data inputted by the selector 7, reads this data at a prescribed timing and supplies this data to the selector 2.

The selector 2 selects the output from the input buffer 1 until all of the data comprising the processing unit for the butterfly operation have been selected from the input buffer 1. Then, after all of the data that is to undergo butterfly operations has been inputted from the input buffer 1, the data inputted from the memory 8 is selected and outputted to the selector 3. The process for executing the butterfly operation is then repeated a prescribed number of times on the results of the butterfly operation from the butterfly operator 4.

For example, as shown in the timing chart in FIG. 3, when the data 0 (butterfly operation results) from the terminal out0 of the butterfly operator 4 and the data 1 (butterfly operation results) from the terminal out1 are respectively outputted, the selector 6 operates on a clock that a period that is ½ (twice the frequency) of the period for the output of the butterfly operator 4. As a result, the data 0 outputted by the terminal out0 is selected in the first half of the period for the output of the butterfly operator and the data 1 outputted by the terminal out1 is selected in the second half of this period. The data 0 and the data 1 is therefore selected by the selector 7, supplied to the memory 8 and written, i.e. the two butterfly operation results outputted simultaneously by the butterfly operator 4 are converted from parallel to serial at the selector 6 and supplied to and stored in the memory 8 via the selector 7. The data stored in the memory 8 is then read-out again and supplied to terminals in0 and in1 of the butterfly operator 4 via the selectors 2 and 3.

Namely, as shown in FIG. 3, reading and writing of data to and from the memory 8 is carried out in ½ a period of the cycle for changing over the selector 6. For example, when the data 0 is outputted by the selector 6, the data 0 is written to the memory 8 in the first half of this period and the data already stored in the memory 8 is read-out in the second half of this period. This data is then inputted to, for example, terminal in0 of the butterfly operator 4 via the selectors 2 and 3.

Data 1 is written to the memory 8 in the first half of the period of the selector 6 outputting the data 1 and prescribed data already stored in the memory 8 is read out in the following half and is supplied to, for example, terminal in1 of the butterfly operator 4 via the selectors 2 and 3.

The same process is then repeatedly executed thereafter.

With this related FFT operation device (in this case, the FFT circuit 104), as shown in FIG. 3, when the frequency of the operating clock of the butterfly operator 4 is taken to be 1, the frequency of the operating clock for the memory 8 has to be four times this frequency. In other words, when the operating clock of the memory 8 is decided, the operation occurring at the butterfly operator 4 has to be carried out at a speed that is ¼ of that of this clock. However, the butterfly operator 4 can operate at a higher speed than this and the maximum processing capabilities are not fulfilled, with this being one reason that hampers making of the FFT operation high-speed.

As the present invention sets out to resolve the aforementioned problems, it is the object of the present invention to carry out operations at a higher speed.

SUMMARY OF THE INVENTION

In order to achieve this object, in claim 1, in a fast Fourier transform operation device feeding an output of a butterfly operator back to an input of the butterfly operator, for carrying out fast Fourier transform operations or inverse fast Fourier transform operations by performing a butterfly operation a prescribed number of times, the fast Fourier transform operation device, with at least one of: a first storage part for storing data inputted to the butterfly operator; a second storage part for temporarily storing data outputted from the butterfly operator and feeding-back read-out data to an input of the butterfly operator; and a third storage part, for storing data that has undergone a butterfly operation a prescribed number of times, has a storage part, with the storage part comprising a plurality of divided storage parts.

Further, in claim 7, in a fast Fourier transform operation method for feeding an output of a butterfly operator back to an input of the butterfly operator and carrying out fast Fourier transform operations or inverse fast Fourier transform operations by performing a butterfly operation a prescribed number of times, at least one of: data inputted to the butterfly operator; data outputted from the butterfly operator and fed-back to an input of the butterfly operator; and data having undergone a butterfly operation a prescribed number of times is divided into a plurality of data, with the divided data being stored at individual storage parts.

According to the FFT operation device and the FFT operation method of the present invention, FFT operations can be carried out at high-speed by adopting a configuration where at least one of: a first storage part for storing data inputted to the butterfly operator; a second storage part for temporarily storing data outputted from the butterfly operator and feeding-back read-out data to an input of the butterfly operator; and a third storage part, for storing data that has undergone a butterfly operation a prescribed number of times, has a storage part, with the storage part comprising a plurality of divided storage parts.

BRIEF DESCRIPTION OF THE DRAWINGS

FIG. 3 is a timing chart illustrating the operation of the example of FIG. 2;

DETAILED DESCRIPTION OF THE PREFERRED EMBODIMENTS

The following is a description of the basic theory of a first to fifth embodiment of the present invention. If the radix in an FFT butterfly operation is taken to be N, then the butterfly operation for one time is carried out with respect to N items of input data and N items of data are obtained the results for this butterfly operation. There is therefore just one input buffer for storing the first input data, memory for storing intermediate results for the butterfly operation and/or output buffer for storing final results for the butterfly operation (hereinafter, the input buffer, memory, and output buffer will be referred to collectively as "storage parts"). Butterfly operations are then carried out after data is read N-times from these storage parts. It is then necessary to write the results of these butterfly operations to the storage parts successively so as to increase the speed of the FFT operations.

In the present invention, N storage parts are prepared when butterfly operations of radix N are carried out. Data is then read from the respective N storage parts simultaneously (in parallel) and butterfly operations are carried out. The N butterfly operation results obtained are then supplied to written simultaneously (in parallel) to N storage parts so as to achieve a high speed in the FFT operations.

A method of arranging N storage parts in such a manner that N items of data corresponding to the N storage parts can be written or read simultaneously will now be described with reference to FIG. 4.

FIG. 4 shows the signal flow for when eight-point FFTs are carried out using a time thinning-out method (Cooley-Tukey method). In FIG. 4, the alphanumeric characters I0 to I7, M0 to M7 and O0 to O7 show the addresses of the input buffers, memory and output buffers, respectively. Further, BTF (butterfly operator) shows a butterfly operator of radix 2, with two storage parts therefore being provided. Namely, input buffers IB0 and IB1 are provided as memory, memory MEM0 and MEM1 are provided as memory and output buffers OB0 and OB1 are provided as output buffers.

When the eight items of input data comprising the object of the FFTs are expressed in a time series as i0 to i7 and output data (final butterfly operation results) obtained by FFT transforming this input data is expressed as o0 to o1 from the low frequency component, the input data i0 to i7 is inputted to addresses I0 to I7, respectively, and output data o0 to o7 is outputted from addresses O0 to O7, respectively.

Figure 4A:
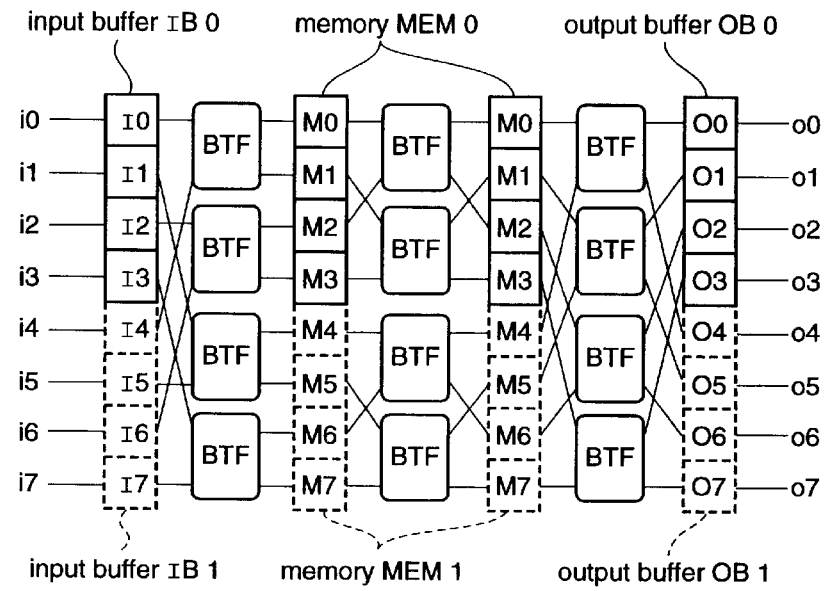
FIGS. 4A and 4B are views to which reference will be made in explaining the theory of the present invention.

Then, as shown in FIG. 4A, the input buffers IB0 and IB1, the memory MEM0 and MEM0 and the output buffers OB0 and OB1 are provided in such a manner as to be divided between the portions of the upper and lower signal flows respectively.

In this case, the input data i0 to i7 is stored in addresses I0 to I3 of the input buffer IB0 and addresses I4 to I7 of the input buffer IB1. The first butterfly operation is then performed after lining-up in so-called reverse bit order by reading from these addresses. The first butterfly operation results are stored in memory MEM0 and MEM1, read-out, and the second butterfly operation is performed, with the results of this second operation then being stored again in memory MEM0 and MEM1. The results of the second butterfly operation are then again read from memory MEM0 and MEM1, a third butterfly operation is performed, and the results are stored in the output buffers OB0 and OB1.

When the input buffers IB0 and IB1, memory MEM0 and MEM1 and output buffers OB0 and OB1 are arranged as shown in FIG. 4A, the two items of input data comprising the first object of a butterfly operation are stored so as to be divided between the addresses I0 and I4, I1 and I5, I2 and I6 and I3 and I7, respectively i.e. stored so as to be divided between input buffer IB0 and input buffer IB1. This data can therefore be read simultaneously and butterfly operations can be carried out. Further, the two items of output data obtained in the final butterfly operation (third butterfly operation) are supplied separately to addresses O0 and O4, O1 and O5, O2 and O6 and O3 and O7, respectively, i.e. supplied so as to be divided between the output buffers OB0 and OB1, respectively and are stored (read) simultaneously.

However, in this case, the two items of data that comprise the object of the second butterfly operation are both stored in either memory MEM0 or MEM1, i.e., for example, the two items of data that are subjected to the second butterfly operation are stored in addresses M0 and M2 of memory MEM0, addresses M1 and M3 of memory M0, addresses M4 and M6 of memory M1 and addresses M5 and M7 of memory MEM1. These two items of data can therefore not be read-out simultaneously in order to carry out this butterfly operation.

In this case, at the memory MEM0 and MEM1, the two items of data obtained as the results of the second butterfly operation are stored in the original address stored for carrying out the third butterfly operation. Namely, for example, the two items of data obtained as a result of the second butterfly operation using the two items of data outputted from address M0 and address M2 are stored at the original addresses M0 and M2. Further, the two items of data obtained as a result of the second butterfly operation using the two items of data read from the addresses M1 and M3 are stored in the original addresses M1 and M3. The data read from the addresses M4 to M7 is also stored in the original addresses M4 to M7 after the second butterfly operation.

It is therefore not possible to read the two items of data obtained as a result of the second butterfly operation at the same time.

Figure 4B:
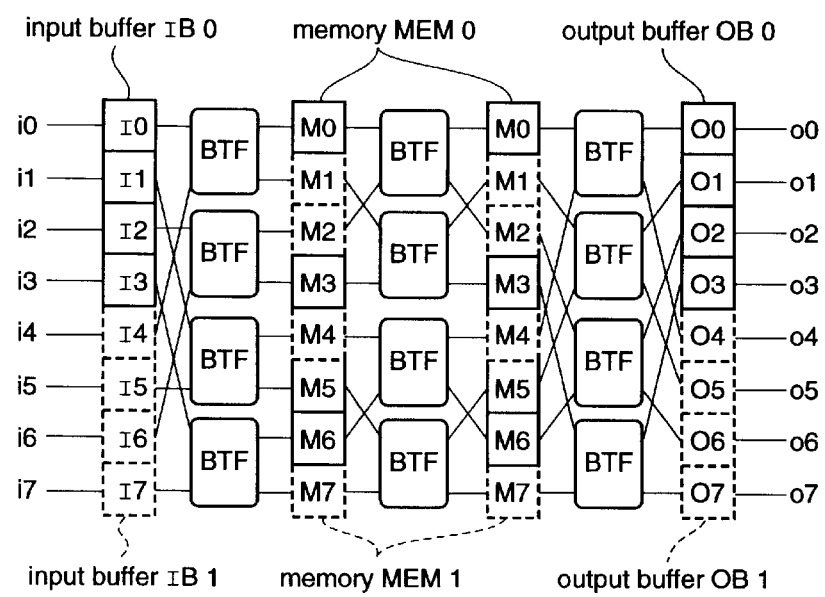

As, for example, shown in FIG. 4B, addresses M0, M3, M5 and M6 are arranged at memory MEM0, and addresses M1, M2, M4 and M7 are arranged at memory MEM1.

In this case, the two items of data comprising the operation of the butterfly object and stored so as to be divided between the memory MEM0 and MEM1, i.e. for example, the two items of data comprising the object of the second butterfly operation are stored in address M0 of memory MEM0 and address M2 of memory MEM1, address M1 of memory MEM1 and address M3 of memory MEM0, address M4 of memory MEM1 and address M6 of memory M0 and address M5 of memory MEM0 and M7 of memory MEM1, and these two items of data are read out for performing a butterfly operation.

As described above, at the memory MEM0 and MEM1, the two items of data obtained as a result of the second butterfly operation are stored at an address (original address) stored for carrying out the third butterfly operation and the writing of the two items of data resulting from the butterfly operation can be carried out simultaneously.

The FFT operation can therefore be made high-speed without increasing the capacity of the storage parts just by carrying out the address control described in FIG. 4B in the same order as before.

The embodiments described in the following are based on the above theory.

First Embodiment

Figure 2:
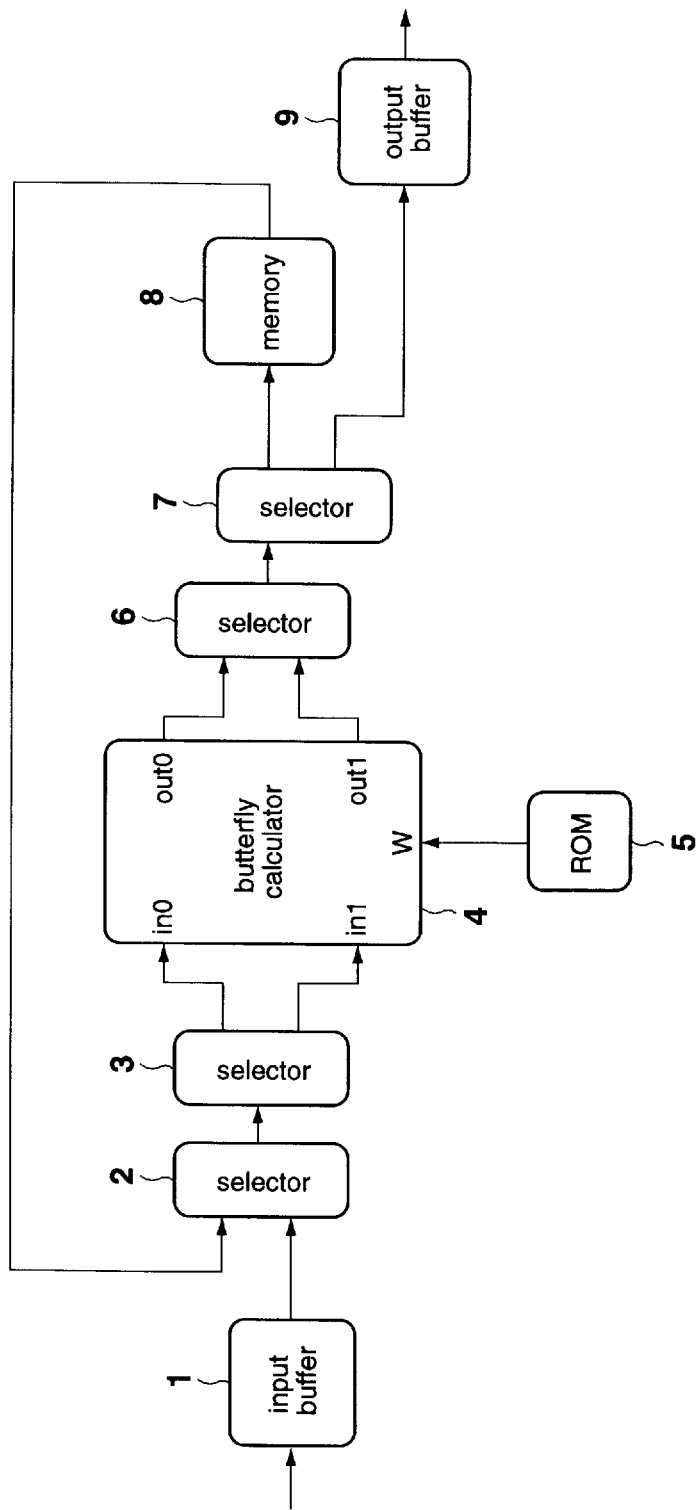
FIG. 2 is a block diagram showing an example configuration for the FFT circuit 104 of FIG. 1.
Figure 5:
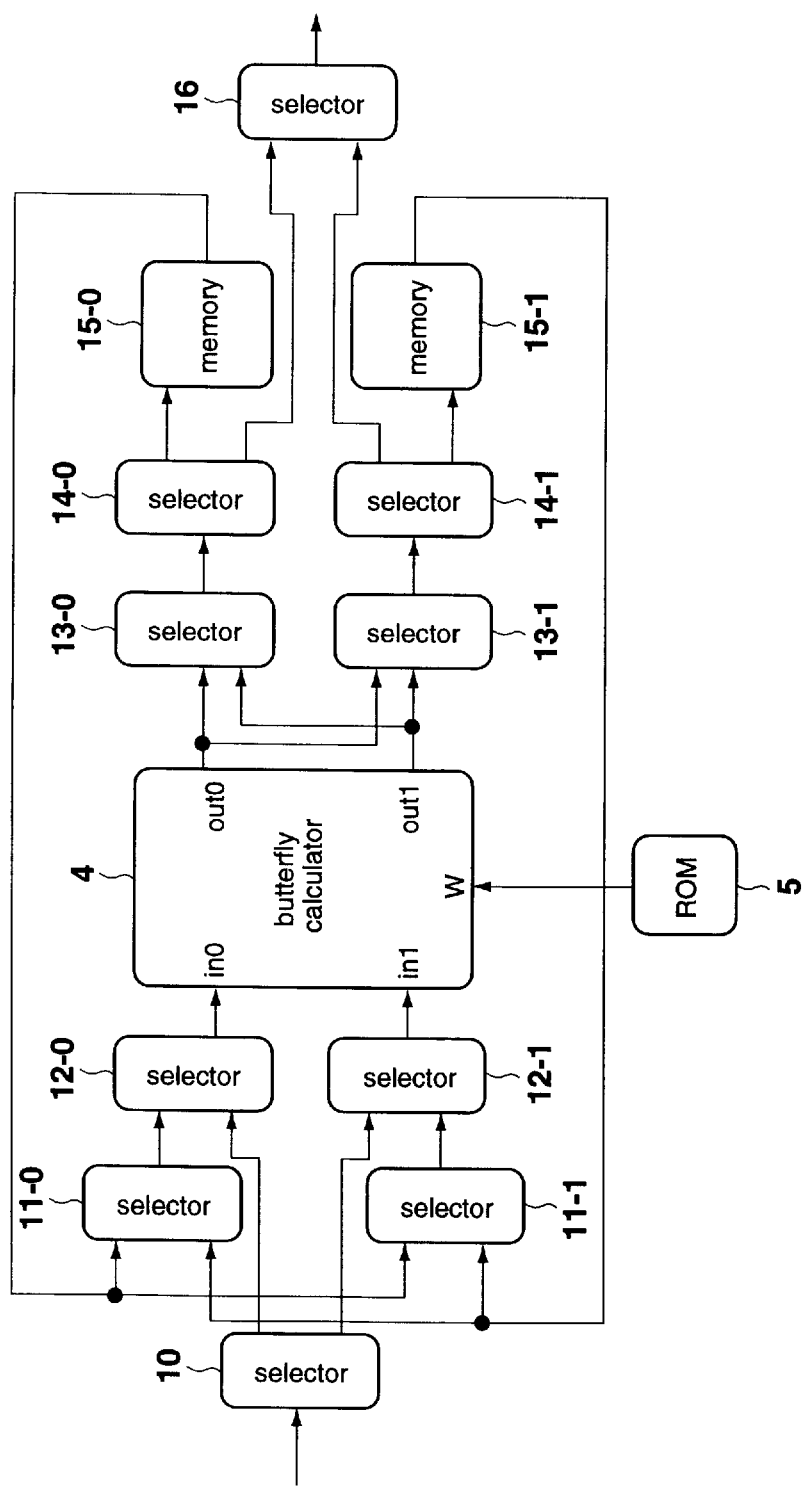
FIG. 5 is a block diagram showing the present invention applied to a configuration of a first embodiment of an FFT operation device.

FIG. 5 shows a configuration of the present invention applied to a first embodiment of an FFT operation device. Portions corresponding to portions in FIG. 2 are given the same numerals and their detailed description is omitted.

A selector 10 supplies input data that is the object of the FFT to one of either of selectors 12-0 or 12-1. The selector 11-0 or 11-1 selects one of the output of memory 15-0 or the output of memory 15-1 and supplies this output to the selector 12-0 or 12-1, respectively. At the selector 11-0, when one of the outputs of memory 15-0 or 15-1 is selected, the selector 11-1 selects the remaining output.

The selector 12-0 selects one of the output of the selector 10 or 11-0 and supplies this output to a terminal in0 of the butterfly operator 4. The selector 12-1 then selects one of the output of the selector 10 or 11-1 and supplies this output to a terminal in1 of the butterfly operator 4.

The selectors 13-0 and 13-1 selects data outputted by one of either the terminal out0 or out1 of the butterfly operator 4 and supplies this to the selectors 14-0 and 14-1. When one of either the output of out0 or out1 is selected at selector 13-0, selector 13-1 selects the remaining output. Data outputted from terminal out0 is then stored in one of either memory 15-0 or 15-1. Further, data outputted from terminal out 1 can then be stored in one of either memory 15-0 or 15-1.

Selector 14-0 and 14-1 supply the output of selector 13-0 and 13-1 to memory 15-0 and 15-1, respectively, and/or to selector 16. The memory 15-0 or 15-1 then stores the data supplied from selector 14-0 and 14-1 and the stored data is then supplied to both the selector 11-0 and the selector 11-1. The selector 16 then selects and outputs one of either the output of selector 14-0 or 14-1.

This operation will now be described. The selector 10 then selects one of selector 12-0 or 12-1 and inputs this data to the terminal in0 or terminal in1 of the butterfly operator 4. The butterfly operator 4 then performs butterfly operations on data inputted by terminal in0 or nl, with the resulting two items of data being outputted to the terminal out0 or out1 respectively, and to both selector 13-0 and 13-1.

At the selector 13-0 and 13-1, the two items of data that are necessary at the same time in the following butterfly operation are stored so as to be divided between the memory 15-0 and 15-1. One of the two items of data supplied from terminal out0 and out1 of the butterfly operator 4 is then selected and outputted via the selector 14-0 or 14-1 to memory 15-0 and 15-1. The memories 15-0 and 15-1 then simultaneously store data supplied via selectors 14-0 and 14-1. The two items of data outputted from terminal out0 and out1 of the butterfly operator 4 can then be stored in memory 15-0 and 15-1 without any particular need for waiting.

The two items of data that are the object of the next butterfly operation stored so as to be divided between the memory 15-0 and 15-1 are read-out simultaneously at a prescribed timing and supplied to selector 11-0 and 11-1.

The selectors 11-0 and 11-1 select data of data read from the memory 15-0 or 15-1 to be inputted to terminal in0 or in1 of the butterfly operator 4 and output this data to selectors 12-0 and 12-1. The selectors 12-0 and 12-1 then select the output of selector 10 until all of the input data comprising a butterfly operation processing unit is supplied from the selector 10 and supplies this data to terminal in0 and in1 of the butterfly operator 4.

After all of the input data that is to undergo butterfly operations has been supplied from the selector 10, selectors 12-0 and 12-1 select data supplied by selector 11-0 and 11-1 and supply this data to terminal in0 and in1 of the butterfly operator 4. Therefore, in this case, data read simultaneously from memory 15-0 and 15-1 is supplied simultaneously to the butterfly operator 4. As a result, butterfly operations can be carried out immediately at the butterfly operator 4.

It is therefore possible to repeat processing for subjecting the results of the butterfly operation to another butterfly operation a prescribed number of times using the butterfly operator 4.

When this butterfly operation processing is carried out a prescribed number of times, i.e. when the final results of the butterfly operation are obtained, thereafter, at the selectors 14-0 and 14-1, data supplied from the selectors 13-0 and 13-1 (the final butterfly operation results) is supplied to the selector 16. At the selector 16, the outputs of selector 14-0 and 14-1, i.e. the two items of data outputted simultaneously from terminals out0 and out1 of the butterfly operator 4 are converted from parallel to serial and outputted.

At the FFT operating device for carrying out the above operations, the selectors 13-0, 13-1, 14-0 and 14-1 operate on the same clock as the clock of the butterfly operator 4. The butterfly operation results from the butterfly operator 4 are then supplied to the memories 15-0 and 15-1 on this clock timing.

Figure 6:
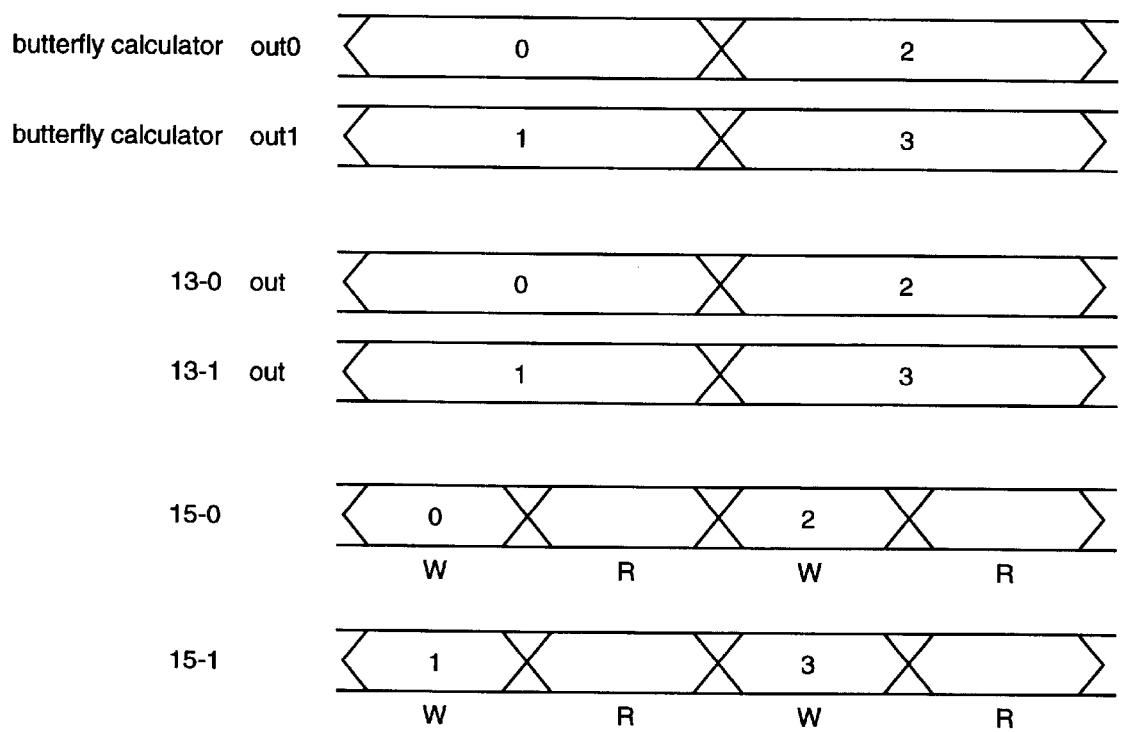
FIG. 6 is a timing chart illustrating the operation of the embodiment of FIG. 5.

Namely, as shown in the timing chart in FIG. 6, when data 0 and data 1 is outputted from terminals out0 and out1 of the butterfly operator 4 respectively, the selectors 13-0 and 13-1 simultaneously select one of these outputs and the remaining output, respectively, on the same clock as the butterfly operator 4.

In the embodiment in FIG. 6, data 0 and 2 outputted from terminal out0 is selected at the selector 13-0 and data 1 and 3 outputted from terminal out1 is selected at the selector 13-1. However, data numbers given in FIG. 6 are given to specify data in order to simplify the description. Therefore, in reality, the output of the butterfly operator 4 does not have to be shown to be selected in any particular way at the selectors 13-0 and 13-1.

Data selected at the selectors 13-0 and 13-1 is simultaneously supplied to the memories 15-0 and 15-1 via selectors 14-0 and 14-1. The memories 15-0 and 15-1 then simultaneously store data from the selectors 13-0 and 13-1, respectively on a clock of half the period of the clock for the butterfly operator 4, with already-stored data being simultaneously read-out and supplied to selectors 11-0 and 11-1.

Namely, when the data 0 and 1 is outputted from the selectors 13-0 and 13-1, the memories 15-0 and 15-1 simultaneously store the data 0 and 1 respectively in the first half of the period for the clock of the butterfly operator 4. The data necessary in the following butterfly operation is then read-out simultaneously in the following half and supplied to the selectors 11-0 and 11-1. Similarly, when data 2 and 3 is outputted from the selectors 13-0 and 13-1 respectively, in the first half this data 2 and 3 is simultaneously stored and in the following half the data necessary in the following butterfly operation is simultaneously read-out.

In this embodiment, reading and writing of data with respect to the memories 15-0 and 15-1 is carried out simultaneously. Therefore, as becomes clear from the timing chart of FIG. 6, when the operating clock for the memories 15-0 and 15-1 is taken to be 1, the operating clock for the butterfly operator 4 can operate at a clock of half this frequency, with twice the speed of that shown for the case shown in FIG. 2 therefore being possible.

The embodiment in FIG. 5 has a configuration that omits the input buffer 1 and the output buffer 9 shown in FIG. 2 but this input buffer 1 and output buffer 9 can also be utilized.
Second Embodiment FIG. 7 shows a configuration of the present invention applied to a second embodiment of an FFT operation device.

Figure 7:
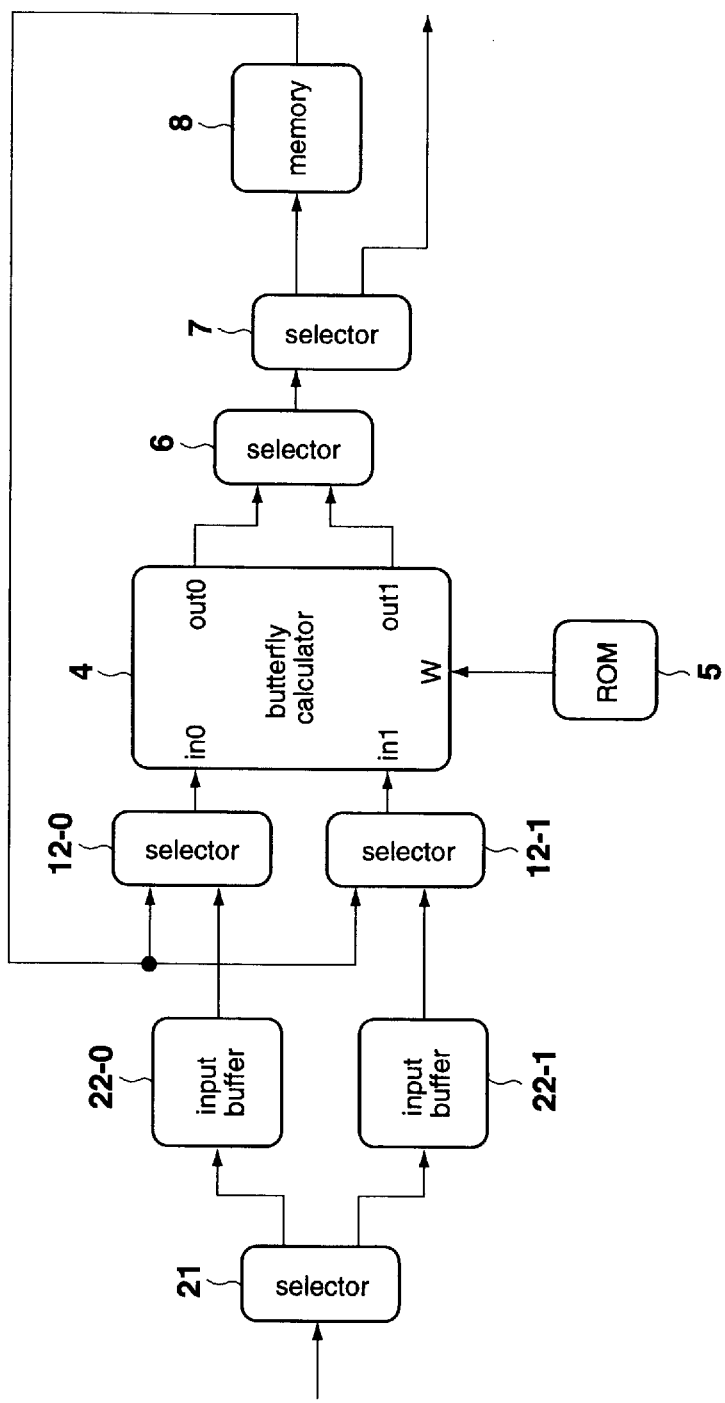
FIG. 7 is a block diagram showing the present invention applied to a configuration of a second embodiment of an FFT operation device.

In FIG. 7, portions corresponding to FIG. 5 and FIG. 2 are given the same numerals and their detailed description is omitted.

A selector 21 supplies input data taken as the object of the FFT to one of an input buffer 22-0 or an input buffer 22-1. The input buffer 22-0 or 22-1 then stores the input data supplied from the selector 21, with already-stored input data being simultaneously read-out and supplied to a selector 12-0 or 12-1.

In this embodiment, in addition to input data, data read from a memory 8 is also inputted to the selectors 12-0 and 12-1. At the selectors 12-0 and 12-1, one of either input data read from the input buffer 22-0 or 22-1 respectively or data supplied from the memory 8 is selected and supplied to the butterfly operator 4.

In this embodiment, the two items of input data comprising the object of the first butterfly operation are supplied so as to be divided between the input buffers 22-0 and 22-1 by selecting the input data at the selector 21. Therefore, in this case, the two items of input data comprising the object of the butterfly operation are stored so as to be divided between the input buffers 22-0 and 22-1.

The two items of input data comprising the object of the butterfly operation stored so as to be divided between the input buffers 22-0 and 22-1 are simultaneously read-out and supplied to the terminals in0 and in1 of the butterfly operator 4 via selector 12-0 and 12-1.

Figure 8:
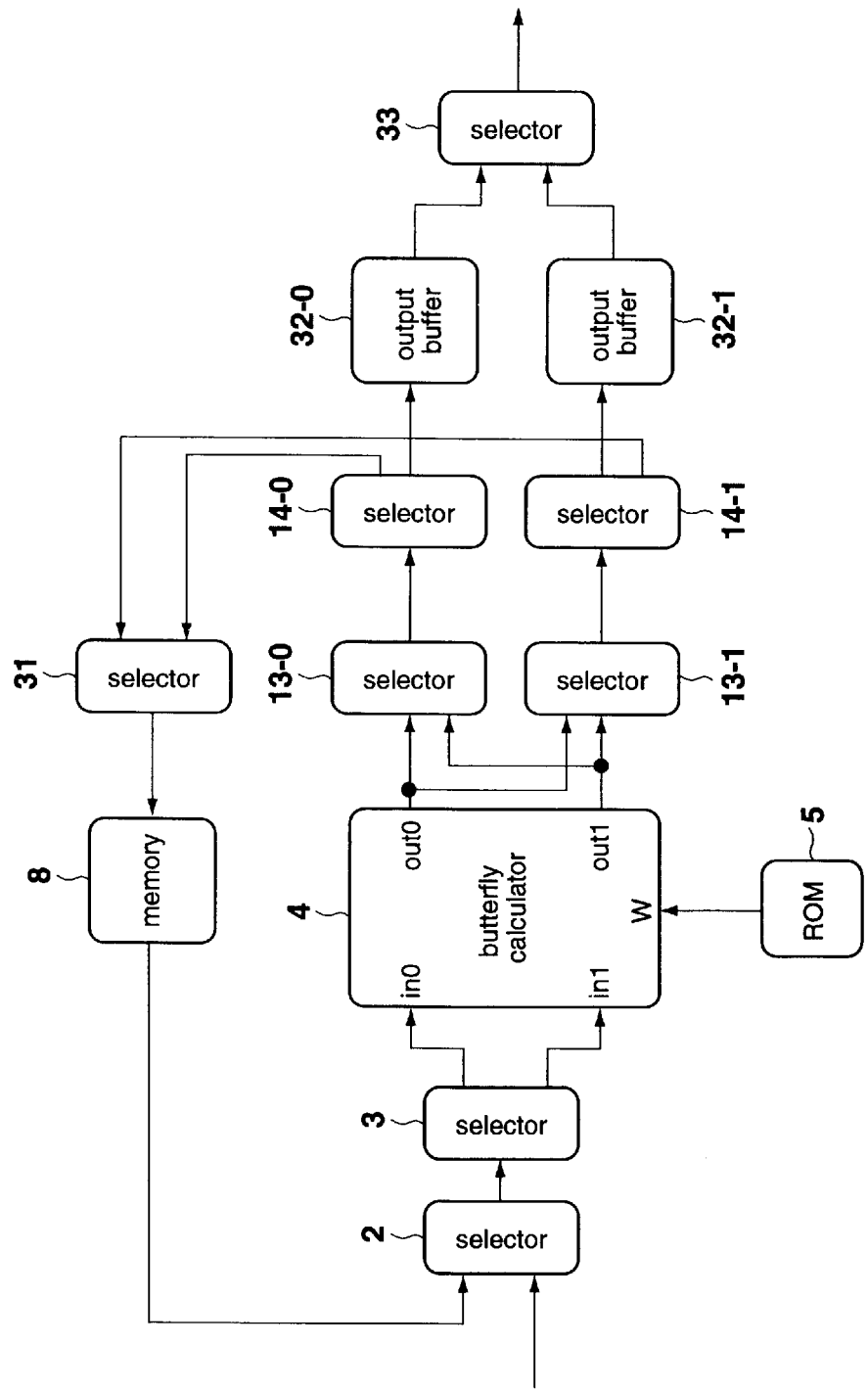
FIG. 8 is a block diagram showing the present invention applied to a configuration of a third embodiment of an FFT operation device.

There is therefore no necessary waiting time in this case because the two items of input data comprising the object of the butterfly calculation are immediate. Namely, in the case shown in FIG. 2, at the butterfly operator 4, one of the two items of input data comprising the object of the butterfly operation coming from the input buffer 1 via selector 2 and 3 is selected and it is necessary to wait for the supplying of the remaining input data from the input buffer 1 via the selectors 2 and 3 in order to carry out the butterfly operation. However, in this embodiment, the two items of data are read simultaneously from the input buffers 22-0 and 22-1 and waiting time is therefore not required, with the speed of processing being increased as a result.
Third Embodiment FIG. 8 shows the configuration of the present invention applied to a third embodiment of an FFT operating device. Portions of FIG. 8 corresponding to portions in FIG. 5 and FIG. 2 are given the same numerals and their detailed description is omitted.

In this embodiment, one of the output of either of the outputs of the selector 14-0 and 14-1 (in FIG. 5, the output supplied to the memory 15-0 or 15-1) is supplied to the selector 31. The selector 31 then selects the output of selector 14-0 or 14-1 on half-periods of the clock for the butterfly operator 4 and supplies these outputs to the memory 8 to be stored.

Further, the remaining output of the two outputs of the selector 14-0 and 14-1 (the output supplied to the selector 16 in FIG. 5) is supplied to the output buffer 32-0 or 32-1. The output buffers 32-0 and 32-1 then simultaneously store the output of the selectors 14-0 and 14-1. Further, the output buffers 32-0 and 32-1 then read the stored data (final results for the butterfly operation) and supply this data to the selector 33. The selector 33 then converts the outputs of the output buffers 32-0 and 32-1 from parallel to serial and outputs the converted data in the same way as the selector 16 of FIG. 5.

In this embodiment, the output of the butterfly operator 4 is supplied to the selector 31 via the selectors 13-0 and 13-1 and selectors 14-0 and 14-1 until the final butterfly operation results are obtained and is then further supplied from the selector 31 to the memory 8. The data stored in this memory 8 is then inputted to the butterfly operator 4 via the selectors 2 and 3 and the butterfly operation is carried out repeatedly with this data taken as the object.

Then, at the butterfly operator 4, when the two items of data taken as the final results for the butterfly operation are obtained, these results are simultaneously supplied to the output buffers 32-0 and 32-1 via the selectors 13-0, 13-1, 14-0 and 14-1 as appropriate, to be stored. Data stored in the output buffers 32-0 and 32-1 is, for example, read-out at the same time, converted from parallel to serial at the selector 33 and outputted.

In this case, the two items of data obtained as the final results for the butterfly operation can be outputted without the butterfly operator 4 having to wait. Namely, in the case shown in FIG. 2, the two items of data outputted from the butterfly operator 4 via the selectors 6 and 7 are serial data and the storing previously outputted data in the output buffer 9 therefore has to be waited for in order to store data outputted afterwards in the output buffer 9. However, in this embodiment, the two items of input data can be written simultaneously to the output buffers 32-0 and 32-1 and waiting time is not required. Processing speed can therefore be improved as a result (in other words, the clock for the output buffers 32-0 and 3201 can be half the frequency of the clock for the output buffer 9 of FIG. 2).

Fourth Embodiment

Figure 9:
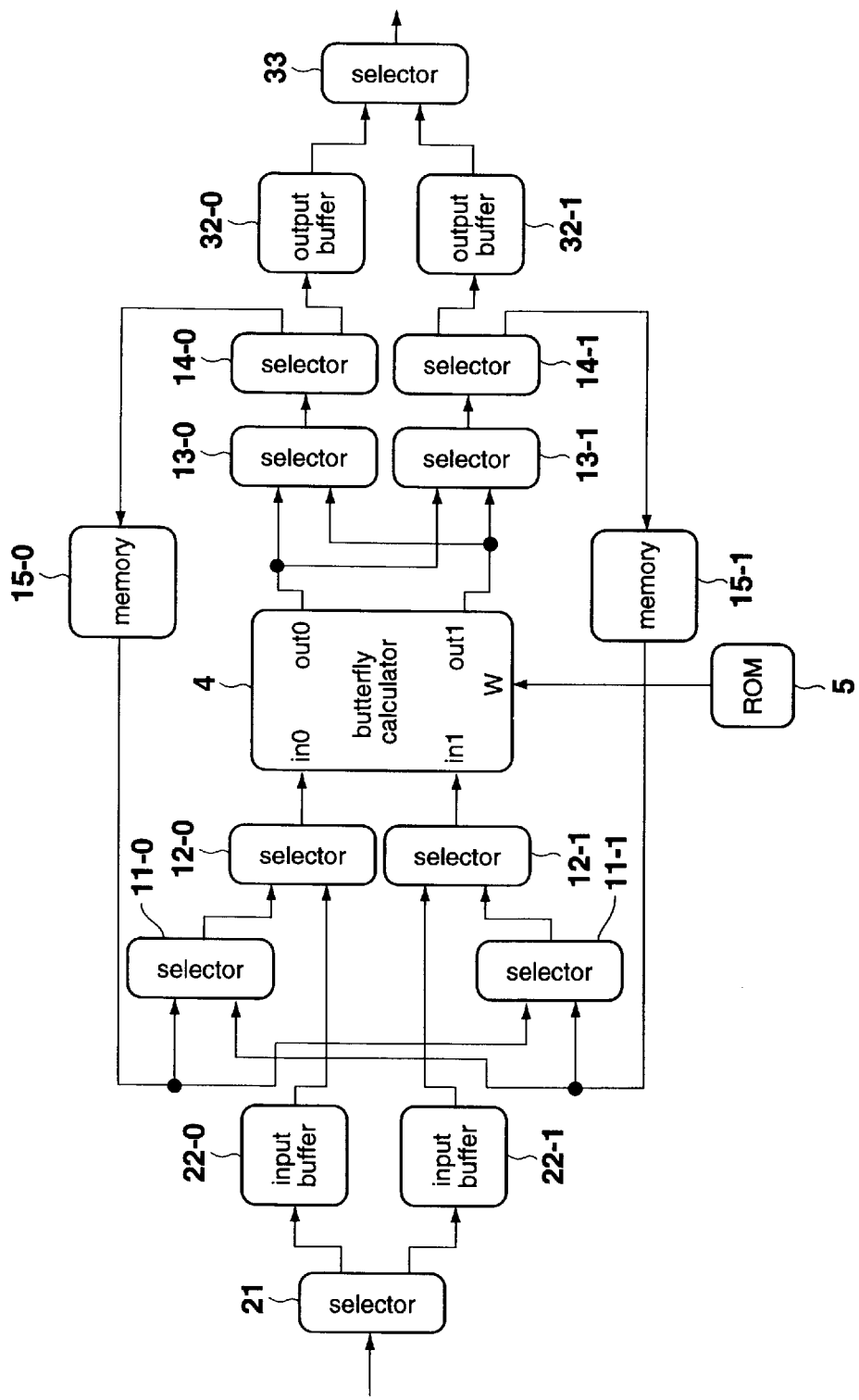
FIG. 9 is a block diagram showing the present invention applied to a configuration of a fourth embodiment of an FFT operation device.

FIG. 9 shows the present invention applied to a fourth embodiment of the FFT operation device. In FIG. 9, portions corresponding to portions of FIG. 5, FIG. 7 or FIG. 8 are given the same numerals and their detailed description is omitted. Namely, this embodiment adopts a configuration that is a combination of that in FIG. 5, FIG. 7 and FIG. 8. This FFT operation device therefore combines the effects of all of these embodiments and the butterfly operation can therefore be carried out even more quickly.

Fifth Embodiment

Figure 10:
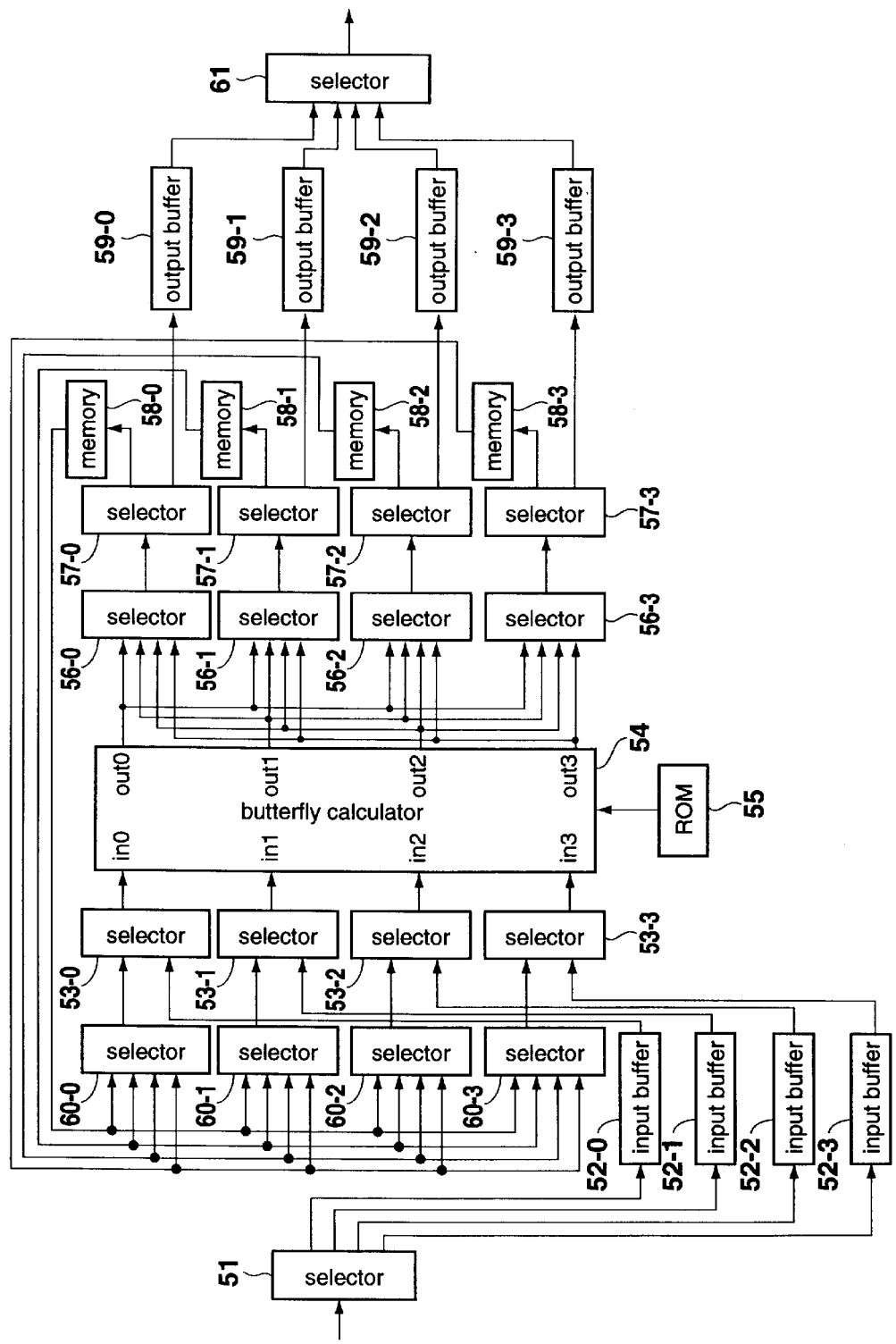
FIG. 10 is a block diagram showing the present invention applied to a configuration of a fifth embodiment of an FFT operation device.

FIG. 10 shows a fifth embodiment of the present invention applied to an FFT operation device. This embodiment has basically the same configuration as the fourth embodiment of FIG. 9 but differs in that a butterfly operation of radix 4 is carried out.

Namely, selector 51 of FIG. 10 corresponds to the selector 21 of FIG. 9 and input buffers 52-0 to 52-3 of FIG. 10 correspond to input buffers 22-0 and 22-1 of FIG. 9. Further, selector 53-0 to 53-3 of FIG. 10 correspond to selectors 12-0 to 12-1 of FIG. 9 and the butterfly operator 54 of FIG. 10 corresponds to the butterfly operator 4 of FIG. 9. Moreover, ROM 55 of FIG. 10 corresponds to the ROM 5 of FIG. 9 and selectors 56-0 to 56-3 of FIG. 10 correspond to selectors 13-0 and 13-1 of FIG. 9. Further, selectors 57-0 to 57-3 of FIG. 10 correspond to selectors 14-0 and 14-1 of FIG. 9 and memories 58-0 to 58-3 of FIG. 10 correspond to memories 15-0 and 15-1 of FIG. 9. Still further, the output buffers 59-0 to 59-3 of FIG. 10 correspond to output buffers 32-0 and 32-1 of FIG. 9 and selectors 60-0 to 60-3 of FIG. 10 correspond to selectors 11-0 and 11-1 of FIG. 9. Selector 61 of FIG. 10 corresponds to selector 33 of FIG. 9.

With the FFT operation device of the above configuration, the selector 51 supplies four units of input data comprising the object of the first butterfly operation in such a manner as to be divided between the input buffers 52-0 to 52-3, with the input data from the selector 51 then being stored at the input buffers 52-0 to 52-3 respectively. At the input buffers 52-0 to 52-3, the stored input data, i.e. the four items of input data taken as the first object of the butterfly operation is simultaneously read-out and simultaneously supplies to terminals in0 to in3 of the butterfly operator 54 via the selectors 53-0 to 53-3. The butterfly operation can then start at the butterfly operator 54 without having to wait.

The butterfly operator 54 then subjects data inputted at terminals in0 to in3 to butterfly operations of a radix of four using rotational operator data (rotational factor) stored in the ROM 55. The resulting four items of data (butterfly operation results) are then outputted from terminal out0 to out3. The data outputted from terminal out to out3 is then all supplied to the selectors 56-0 to 56-3.

At the selectors 56-0 to 56-3, one of each of the four items of data supplied from the terminals out0 to out3 of the butterfly operator 54 are selected at the selectors 56-0 to 56-3 in such a manner that the four items of data necessary simultaneously in the following butterfly operation are stored so as to be divided between the memories 58-0 to 58-3. This data is then supplied to the memories 58-0 to 58-3 via the selectors 57-0 to 57-3. The memories 58-0 to 58-3 then store the data supplied via the selectors 57-0 to 57-3 simultaneously. The four items of data outputted from terminals out0 to out3 of the butterfly operator 54 are then stored at the memories 58-0 to 58-3 without waiting.

The four items of data comprising the object of the following butterfly operation stored so as to be divided between the memories 58-0 to 58-3 are read simultaneously at a. prescribed timing and all supplied to the selectors 60-0 to 60-3.

The selectors 60-0 to 60-3 select data from data read from the memories 58-0 to 58-3 that is to be inputted to terminals in0 to in3 of the butterfly operator 54 and outputs this data to selectors 53-0 to 53-3. The selectors 53-0 to 53-3 select the outputs of the input buffers 52-0 to 52-3 until all of the input data comprising the butterfly operation processing units is supplied from the input buffers 52-0 to 52-3 and supplies this data to the terminals in0 to in3 of the butterfly operator 54.

After all of the input data that is to be subjected to the butterfly operation has been supplied from the input buffers 52-0 to 52-3, the selectors 53-0 to 53-3 select data supplied by the selectors 60-0 to 60-3 and supply this data to the terminals in0 to in3 of the butterfly operator 54. Data read simultaneously from the memories 58-0 to 58-3 in this case is therefore simultaneously supplied to the butterfly operator 54 and butterfly operations can therefore be immediately carried out at the butterfly operator 54.

A process for performing butterfly operations again on the butterfly operation results can therefore be repeatedly executed a prescribed number of times using the butterfly operator 54.

When the butterfly operation has been carried out a prescribed number of times, i.e. when the final butterfly operation results are obtained, at the selectors 57-0 to 57-3, data supplied from the selectors 56-0 to 56-3 is supplied simultaneously to the output buffers 59-0 to 59-3 and stored. The butterfly operator 54 can therefore output the four items of data obtained as the final results of the butterfly operation without waiting.

The data stored at the output buffers 59-0 to 59-3 is then read-out, for example, simultaneously, converted from parallel to serial at the selector 61 and outputted.

As shown in the above, high-speed processing can also be achieved when FFT operations are carried out using butterfly operations of a radix of four.

Next, a description will be given using a sixth to ninth embodiment with regards to a further method for increasing the speed of the FFT operation.

Sixth Embodiment

Figure 11:
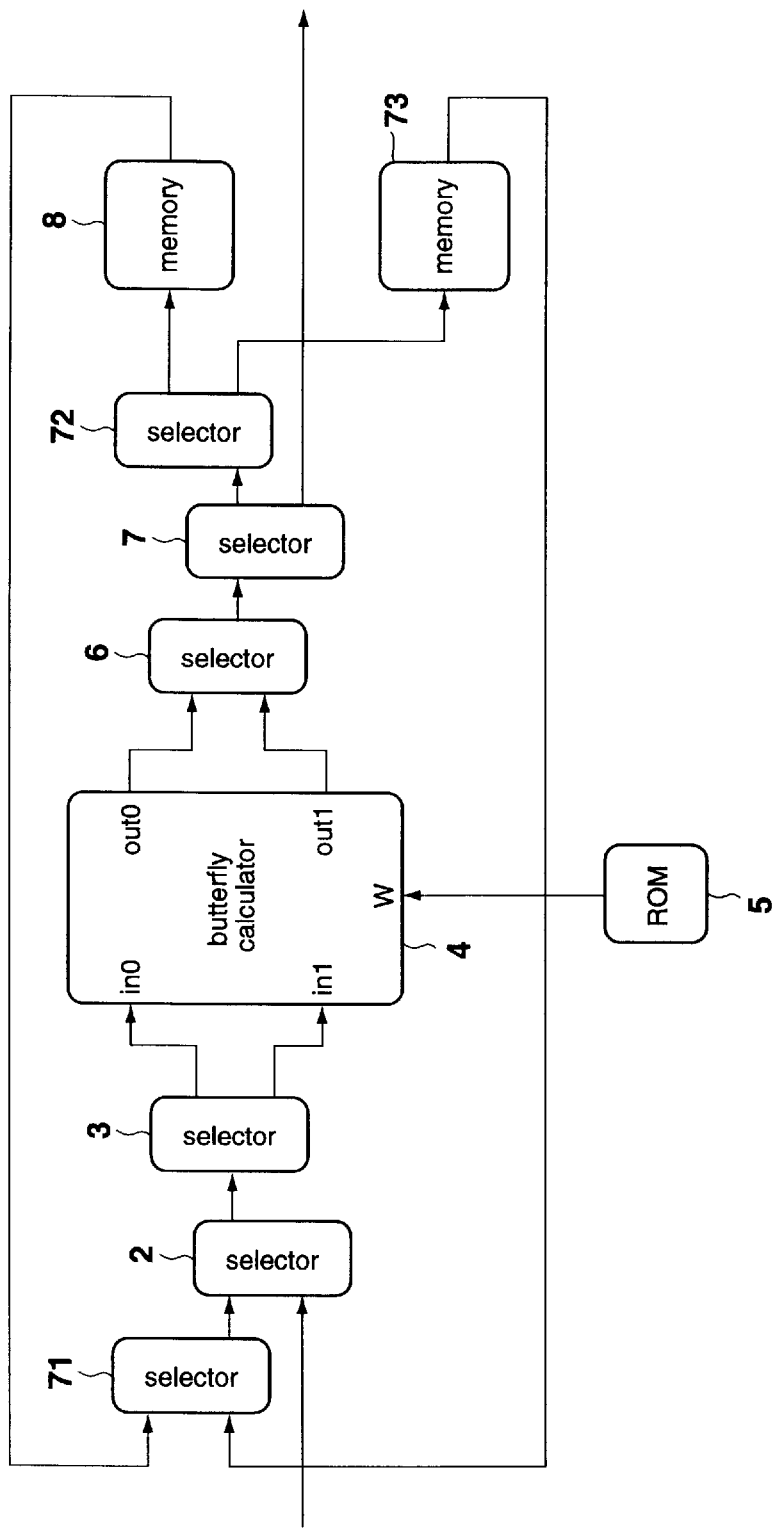
FIG. 11 is a block diagram showing the present invention applied to a configuration of a sixth embodiment of an FFT operation device.

FIG. 11 is a block view showing a sixth embodiment of the present invention, with portions that are the same as portions in FIG. 2 being given the same numerals and not being described in detail. In this embodiment, a selector 71 is provided prior to the selector 2. This selector 71 selects one of the output of the memory 8 and the output of a memory 73 and outputs this to the selector 2. Further, the selector 2 selectively outputs the output of the selector 7 to the memory 8 and the memory 73. Other aspects of this configuration are the same as the case in FIG. 2.

Next, the operation will be described. The FFT operation carried out by the embodiment of FIG. 11 is the same as the FFT operation carried out in FIG. 2, with just the timing being different from the case in FIG. 3. In the following, a description will be given mainly of the timing of the operation process.

Figure 12:
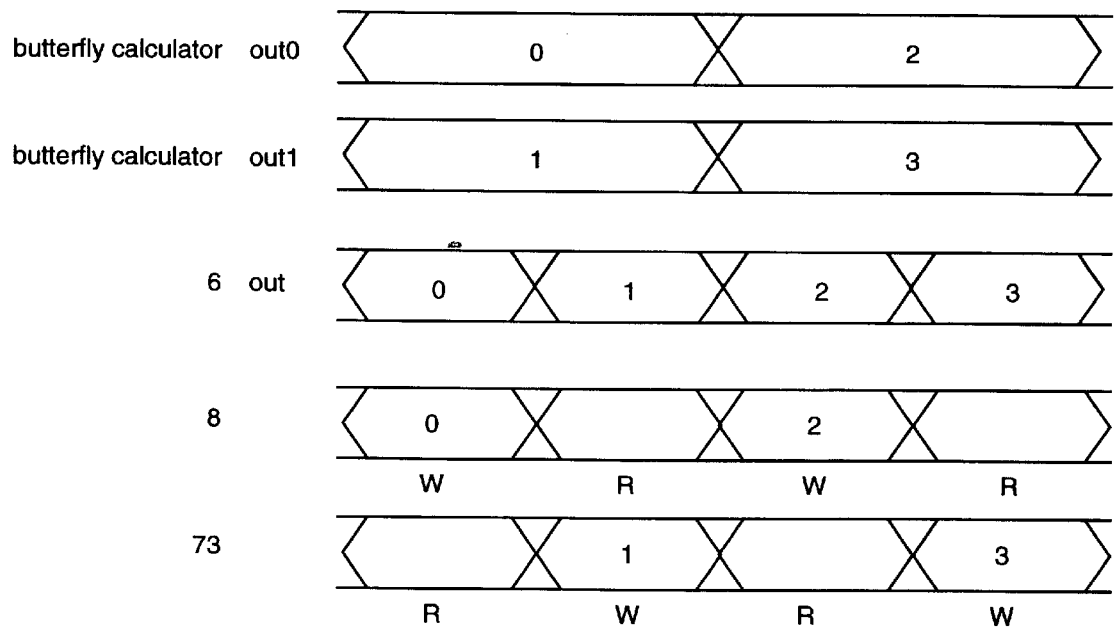
FIG. 12 is a timing chart illustrating the operation of the embodiment of FIG. 11.

As shown in the timing chart in FIG. 12, when data 0 or data 1 is outputted by the terminals out0 to out3 of the butterfly calculator 4, the selector 6 selects the output of the butterfly calculator 4 using a clock of half the period of the clock for the butterfly calculator 4. i.e. in the first half of the period for the clock for the butterfly calculator 4, data 0 outputted by the output terminal 0 is selected and in the second half, the data 1 outputted by the terminal out1 is selected. Similarly, when the data 2 or the data 3 is outputted by the terminals out0 and out1 of the butterfly calculator 4, the data 2 is selected in the first half of the period and the data 3 is selected in the second half of the period.

The selector 7 supplies data inputted by the selector 6 to the selector 72 until the butterfly operation of the butterfly calculator 4 is complete. The selector 72 then operates on the same period clock as the selector 6 and data inputted by the selector 6 is alternately outputted to the memory 8 and the memory 73.

For example, when data 0 is supplied to the memory 8, the following data 1 is supplied to the memory 73, the following data 2 is supplied to the memory 8 again and the following data 3 is supplied to the memory 73. When data 0 is inputted by the selector 72, the memory 8 writes this, the following data 1 is supplied to the memory 73 by the selector 72. Then, at the timing of the writing operation, the data 0 already stored in the memory 8 is inputted to, for example, terminal in0 of the butterfly calculator 4 via the selectors 71, 2 and 3.

Further, when data 1 is inputted by the selector 72, this is written in at the memory 73. When the selector 72 then supplies the following data 2, the data 1 already stored in the memory 73 is read-out and supplied to, for example, the terminal in1 via the selectors 71, 2 and 3.

In this embodiment, as becomes clear with reference to the timing chart of FIG. 12, when the operating clock for the memory 8 and the memory 73 is taken to be 1, the operating clock of the butterfly calculator 4 can operate using a clock that is ½ of this frequency and a higher speed than the case shown in FIG. 2 is therefore possible.

In the embodiment in FIG. 11, a configuration is adopted where the input buffer memory 1 and the output buffer memory 9 of FIG. 2 have been omitted but it is also possible to utilize this kind of input buffer memory and output buffer memory.

Seventh Embodiment

Figure 13:
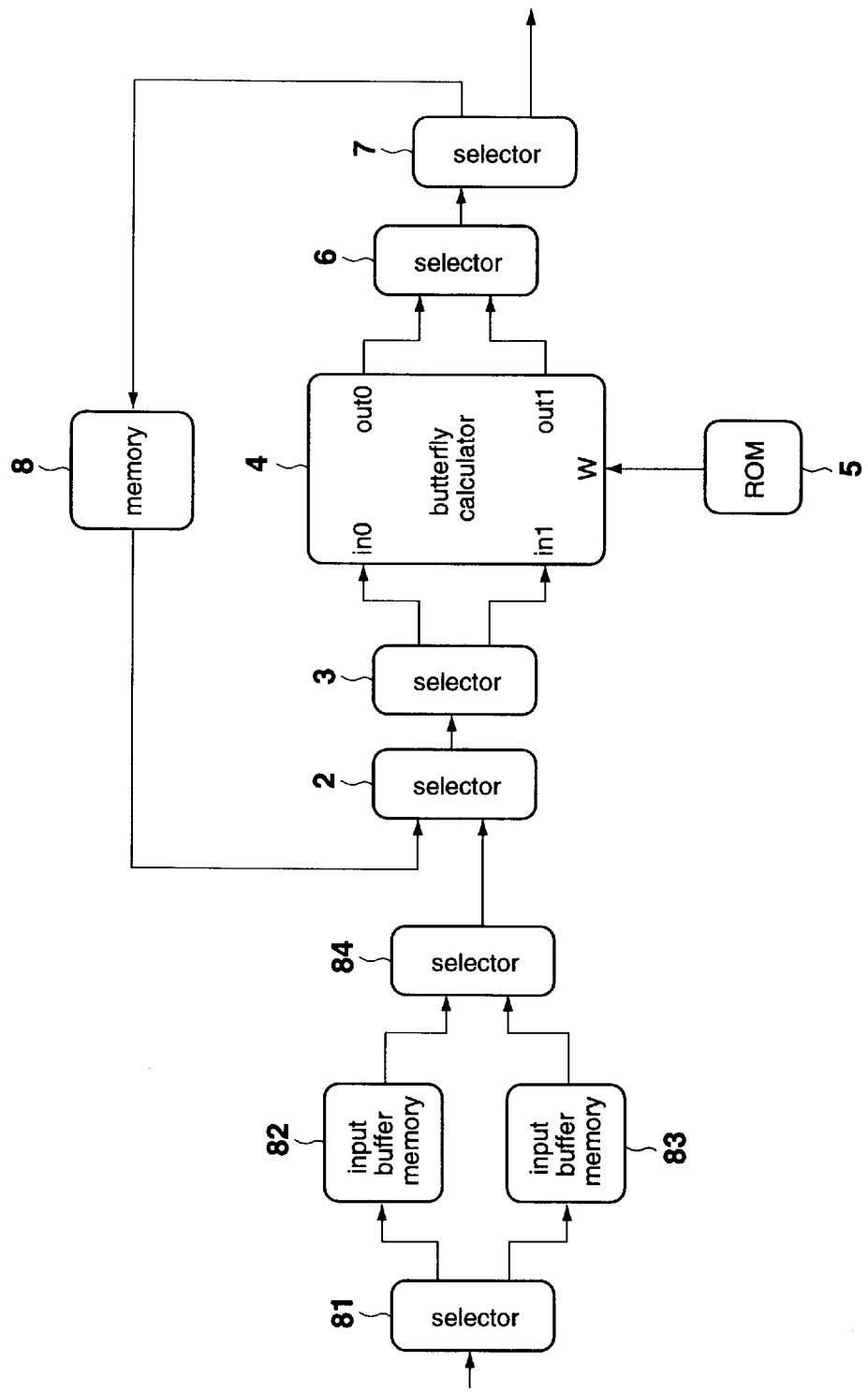
FIG. 13 is a block diagram showing the present invention applied to a configuration of a seventh embodiment of an FFT operation device.

FIG. 13 shows a seventh embodiment. In this embodiment, a circuit comprising selectors 81 and 84, and input buffer memories 82 and 83 is arranged before the selector 2. The selector 81 then supplies inputted data alternately to the input buffer memories 82 and 83. The selector 84 alternately selects data read by the input buffer memories 82 and 83 and outputs this data to the selector 2. Other aspects of this construction are the same as the case in FIG. 2.

Figure 14:
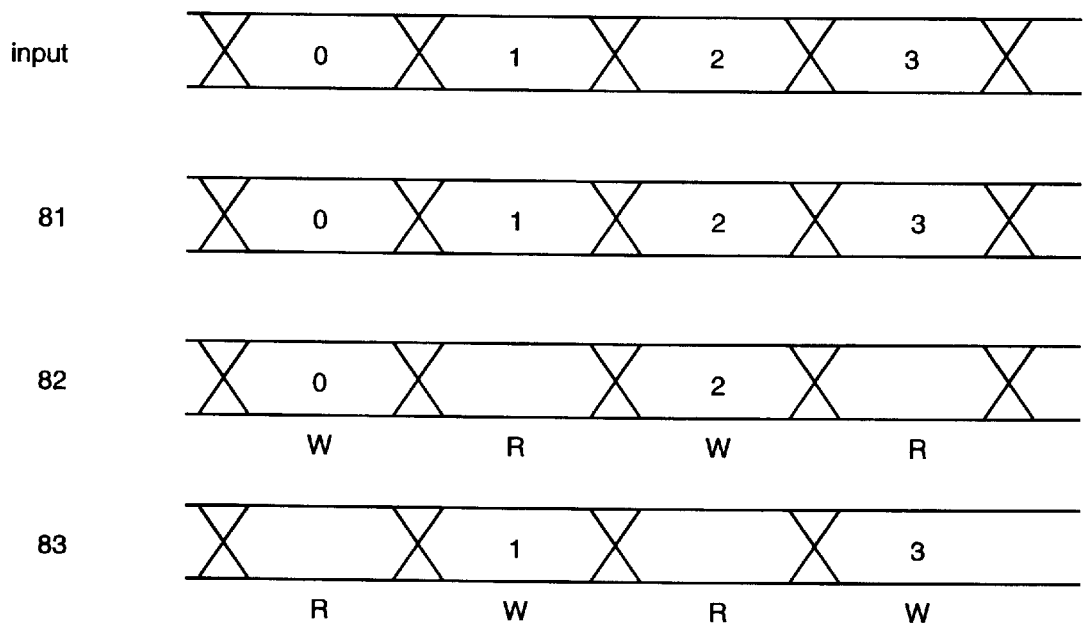
FIG. 14 is a timing chart illustrating the operation of the embodiment of FIG. 13.

In this embodiment, as shown, for example, in FIG. 14, when data 0, data 1 data 2 and data 3 is sequentially inputted to the selector 81, the selector 81 alternately selects this data and alternately outputs this data to the input buffer memory 82 and the input buffer memory 83. For example, when the input data 0 is supplied to the input buffer memory 82, the following data 1 is supplied to the input buffer memory 83, the subsequent data 2 is supplied to the input buffer memory 82, and the next data 3 is supplied to the input buffer memory 83.

This is to say that, when, for example, data 0 is inputted, this data is written in to the input buffer memory 82, and the data 0 already stored in the input buffer memory 82 is read-out at the time when the selector 81 supplies the following data 1 to the input buffer memory 83 and inputted to, for example, the terminal in0 of the butterfly calculator 4 via the selectors 84, 2 and 3.

On the other hand, when data 1 is inputted, this is written to the input buffer memory 83. Data 1 already written to the input buffer memory 83 is then read-out at the timing at which the following data 2 is supplied to the input buffer memory 82 by the selector 81 and this data 1 is then inputted to, for example, the terminal in1 of the butterfly operator 4 via the selectors 84, 2 and 3.

In this embodiment, the process from the selector 2 onwards is carried out by performing butterfly operations at the same speed as the case in FIG. 2. However, the processing units of data that undergo the butterfly operation are first supplied so that the data to be inputted to, for example, the terminal in0 of the butterfly calculator 4 is continuous and the data to be inputted to the terminal in1 after this is continuous. As a result, in the example in FIG. 2, the butterfly operation cannot start until all of the units of data to undergo butterfly operations at the input buffer memory 1 have all been written-in.

If writing and reading are carried out alternately at the input buffer memory 1 the butterfly operation occurring at the butterfly calculator 4 can start to all practical purposes at the time when the first data to be inputted afterwards to the terminal in1 is written to the input buffer memory 1, after all of the data to be supplied to the terminal in0 is inputted to the input buffer memory 1. However, in order to do this it is necessary for clock frequency occurring at the input buffer memory 1 to be twice the frequency of the transmission rate of the inputted data.

With regards to this, with the embodiment in FIG. 13, writing can be carried out alternately to the input buffer memory 82 and the input buffer memory 83 using the same frequency clock as for the transmission rate of the inputted data. Then, after the data to be inputted to the terminal in0 of the butterfly calculator 4 has all been written to the input buffer memory 82 and the input buffer memory 83, the butterfly operation due to the butterfly operator 4 can be started in practical terms by alternately reading data written to the input buffer memory 82 and the input buffer memory 83 from the following timing at the time when the first data to be inputted to in terminal in1 of the butterfly operator 4 is written to the input buffer memory 83. The frequency of the clock for driving the input buffer memory 82 and the input buffer memory 83 at this time can then be made to be ½ of the clock driving the input buffer memory 1 of the example in FIG. 2.

Therefore, when comparing with the example of FIG. 2, when the clock driving the input buffer memories is made to be the same, the butterfly operation can be started at a faster timing (the time it takes to write approximately ½ of the processing unit for the butterfly operation) and the delay time for the overall system can be shortened.

Eighth Embodiment

Figure 15:
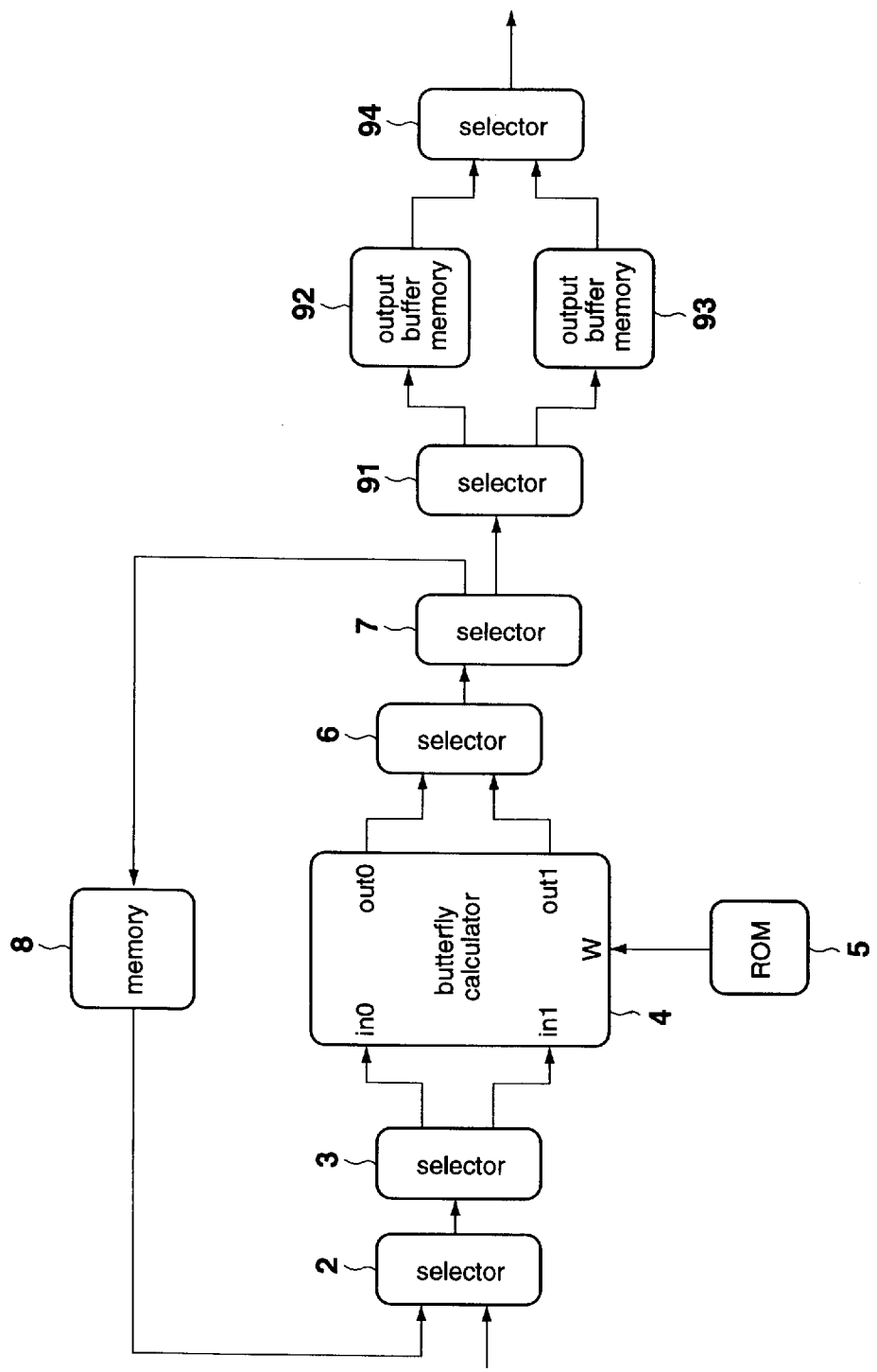
FIG. 15 is a block diagram showing the present invention applied to a configuration of an eighth embodiment of an FFT operation device.

FIG. 15 shows an eighth embodiment. In this embodiment, a circuit comprising selectors 91 and 94, and output buffer memories 92 and 93 is connected after the selector 7. The selector 91 then alternately outputs data inputted by the selector 7 to the output buffer memories 92 and 93. The selector 94 sequentially selects and then outputs data read alternately from the output buffer memory 92 and the output buffer memory 93. Other aspects of this configuration are then the same as the case in FIG. 2.

Figure 16:
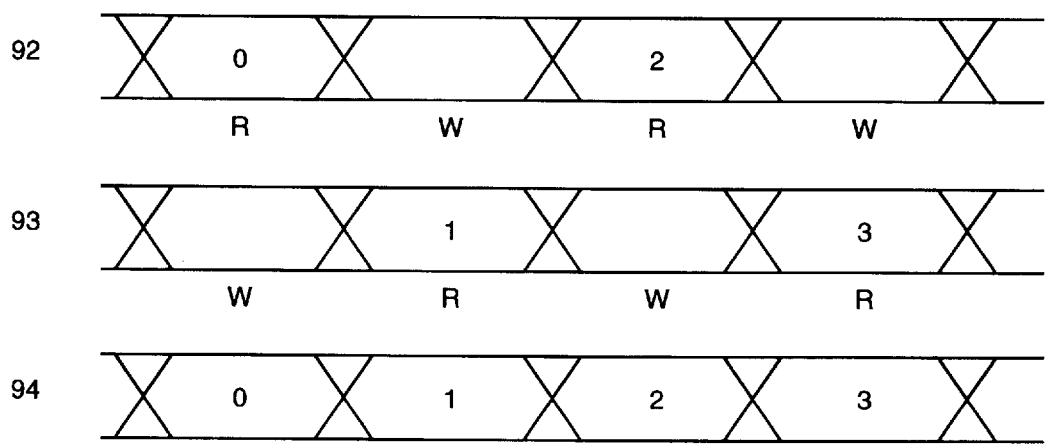
FIG. 16 is a timing chart illustrating the operation of the embodiment of FIG. 15.

When butterfly operation results outputted by the butterfly operator 4 are inputted by the selector 7, as shown in FIG. 16, the selector 91 alternately supplies data to the output buffer memory 92 and the output buffer memory 93. The selector 94 then alternately selects and outputs data read out alternately from the output buffer memory 92 and the output buffer memory 93.

For example, as shown in the timing chart of FIG. 16, the following data from the selector 91 is written to the output buffer memory 93 at the timing when data 0 is read from the output buffer memory 92. Then, when the selector 94 reads and outputs the data 1 that is the data following the data 0 from the output buffer memory 93, the following data is written to the output buffer memory 92 from the selector 91. This kind of operation is then repeated so that data is sequentially outputted as the butterfly results from the selector 94 in the order of the data 0, data 1, data 2 and data 3.

In this embodiment, the configuration of the stages before the selector 7 is the same as for the example in FIG. 2 and the speed of the butterfly operation is therefore the same as for the example in FIG. 2.

However, when, for example, the sequence of data to be outputted as canonical data for the butterfly operation results obtained in the case of, for example, inputting bits in reverse order, is taken to be, for example, 0, 1, 2, . . . n , the 0th and n/2th data is obtained first, followed by the first and n/2+1th data. Therefore, in the example in FIG. 2, reading cannot start until all of the operation results have been written to the output buffer memory 9.

Reading can start in practical terms from the time when writing of the first data is complete if writing and reading are carried out alternately at the output buffer memory 9. However, in this case, the clock of the output buffer memory 9 has to be twice the frequency of the transmission rate for data inputted at the output buffer memory 9.

Because of this, in the embodiment in FIG. 15, not only can reading start immediately when writing of the first data is carried out by the output buffer memory 93, but the but the frequency of the operating clocks of the output buffer memory 92 and the output buffer memory 93 in this case can also be the same frequency as the data transmission rate.

In the embodiment of FIG. 13, the input buffer memory is divided into two in practical terms but in the eighth embodiment in FIG. 15 the output buffer memory is essentially divided into two stages.

Ninth Embodiment

Figure 17:
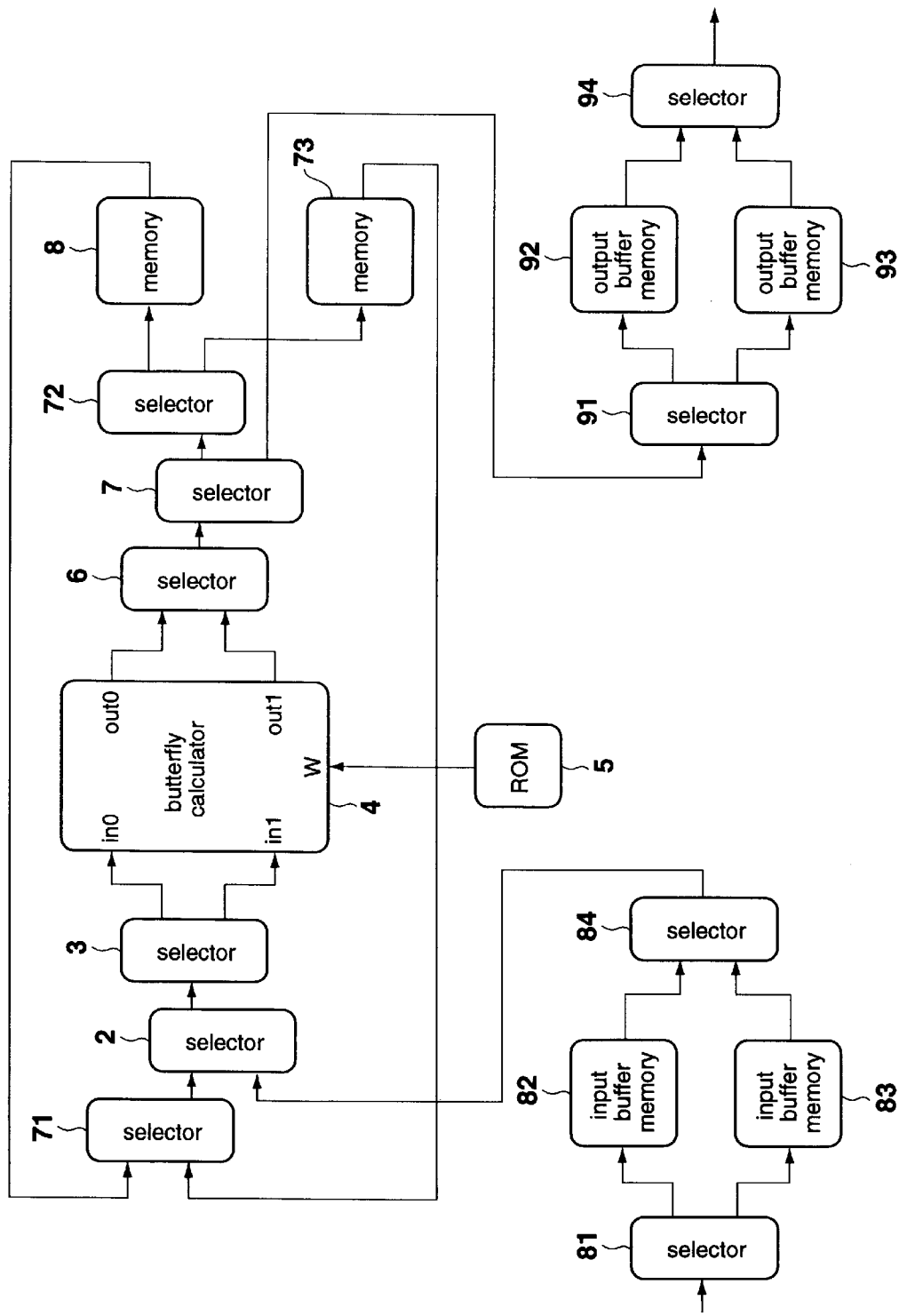
FIG. 17 is a block diagram showing the present invention applied to a configuration of a ninth embodiment of an FFT operation device.

FIG. 17 shows a ninth embodiment. This embodiment is a combination of the embodiments of FIG. 11, FIG. 13 and FIG. 15. Namely, a selector 71 is provided as a stage previous to the selector 2. The output of the memory 8 is then supplied to one input of the selector 71 and the output of the memory 73 is supplied to the remaining input of the selector 71. A selector 72 connected as the stage following the selector 7 alternately supplies the output of the selector 7 to the memory 8 and the memory 73.

The input data is supplied to the input buffer memory 82 and the input buffer memory 83 by the selector 81. Data read from these input buffer memories is then supplied to the selector 2 via the selector 84. Further, data outputted by the selector 7 is supplied by the selector 91 to the output buffer memory 92 and the output buffer memory 93. This data is then read-out after writing and outputted via the selector 94.

Because this embodiment is a configuration that combines the embodiments of FIG. 11, FIG. 13 and FIG. 15, this embodiment has all of the results of these embodiments. The ninth embodiment is therefore capable of carrying out the fastest butterfly operations of the sixth to ninth embodiments.

Examples were given in the sixth to ninth embodiments of the case where the radix N is 2, but it is also possible for the memory or the input buffer memory to be divided into 2 when the radix N is two or more.

Tenth Embodiment

Figure 18:
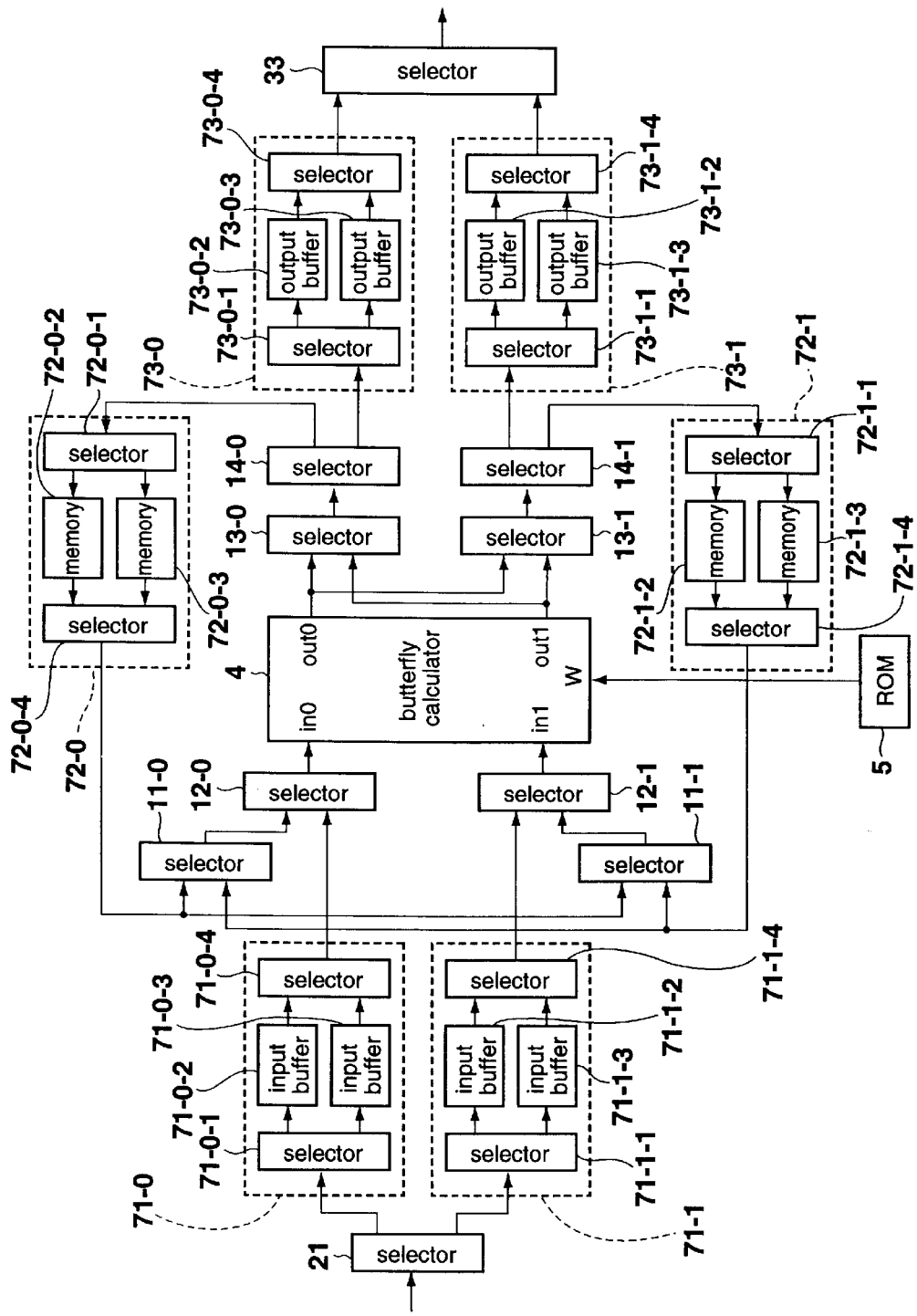
FIG. 18 is a block diagram showing the present invention applied to a configuration of a tenth embodiment of an FFT operation device.

FIG. 18 shows the present invention applied to a tenth embodiment of an FFT operation device. This embodiment combines the fourth embodiment and the ninth embodiment. The input buffers, memory for storing intermediate processing data for the butterfly operation and the output buffers are divided into a number that is the same as the radix. Further, each memory and buffer is divided into 2, with one reading while the other is writing.

Portions of FIG. 18 corresponding to the case of FIG. 9 are given the same numerals. Namely, other than input buffers 71-0 and 71-1, memories 72-0 and 72-1 and output buffers 73-0 and 73-1 being provided in place of the input buffers 22-0 and 22-1, memories 15-0 and 15-1, and output buffers 32-0 and 32-1, the configuration is the same as the FFT operation device of FIG. 9.

The input buffer 71-0 comprises a selector 71-0-1, input buffers 71-0-2 and 71-0-3 and a selector 71-0-4. The selector 71-0-1 alternately supplies data inputted at the input buffer 71-0 alternately to the input buffers 71-0-2 and 71-0-3.

The input buffers 71-0-2 and 71-0-3 store data supplied from the selector 71-0-1, with stored data being read and supplied to the selector 71-0-4.

The selector 71-0-4 alternately selects and outputs data supplied from the input buffers 71-0-2 and 71-0-3.

The selector 71-0-4 selects the one of the input buffers 71-0-2 and 71-0-3 to which data is not being supplied from the selector 71-0-1. The input buffer 71-0 therefore carries out reading from the remaining input buffer when data is being written to one of the input buffers 71-0-2 or 71-0-3.

The input buffer 71-1, memories 72-0 and 72-1, and output buffers 73-0 and 73-1 are also comprised of a selector 71-1-1, input buffers 71-1-2 and 71-1-3, and a selector 71-1-4, a selector 72-0-1, memories 72-0-2 and 72-0-3, and selectors 72-0-4 and 72-1-1, memories 72-1-2 and 72-1-3, and selectors 72-1-4 and 73-0-1, output buffers 73-0-2 and 73-0-3, selector 73-0-4, selector 73-1-1, output buffers 73-1-2 and 73-1-3 and selector 73-1-4 corresponding to a selector 71-0-1, input buffers 71-0-2 and 71-0-3 and selector 71-0-4 of the input buffer 71.

With the FFT operation device of the above configuration, when data is being written to one of the input buffer 71-0-2 and 71-0-3, data is read from the remaining input buffer so that the reading and writing of data can be carried out simultaneously to and from the input buffer 71-0. This is also the case for the input buffer 71-1, memories 72-0 and 72-1 and output buffers 73-0 and 73-1 of the same configuration as the input buffer 71-0. It is therefore possible to achieve a high processing speed when compared with the case of FIG. 9 where reading and writing of data is carried out separately (in other words, the clock for the input buffers 71-0 and 71-1, memories 72-0 and 72-1 and output buffers 73-0 and 73-1 can be half the frequency of the clock for the input buffers 22-0 and 22-1, memories 15-0 and 15-1 and output buffers 32-0 and 32-1).

Figure 1:
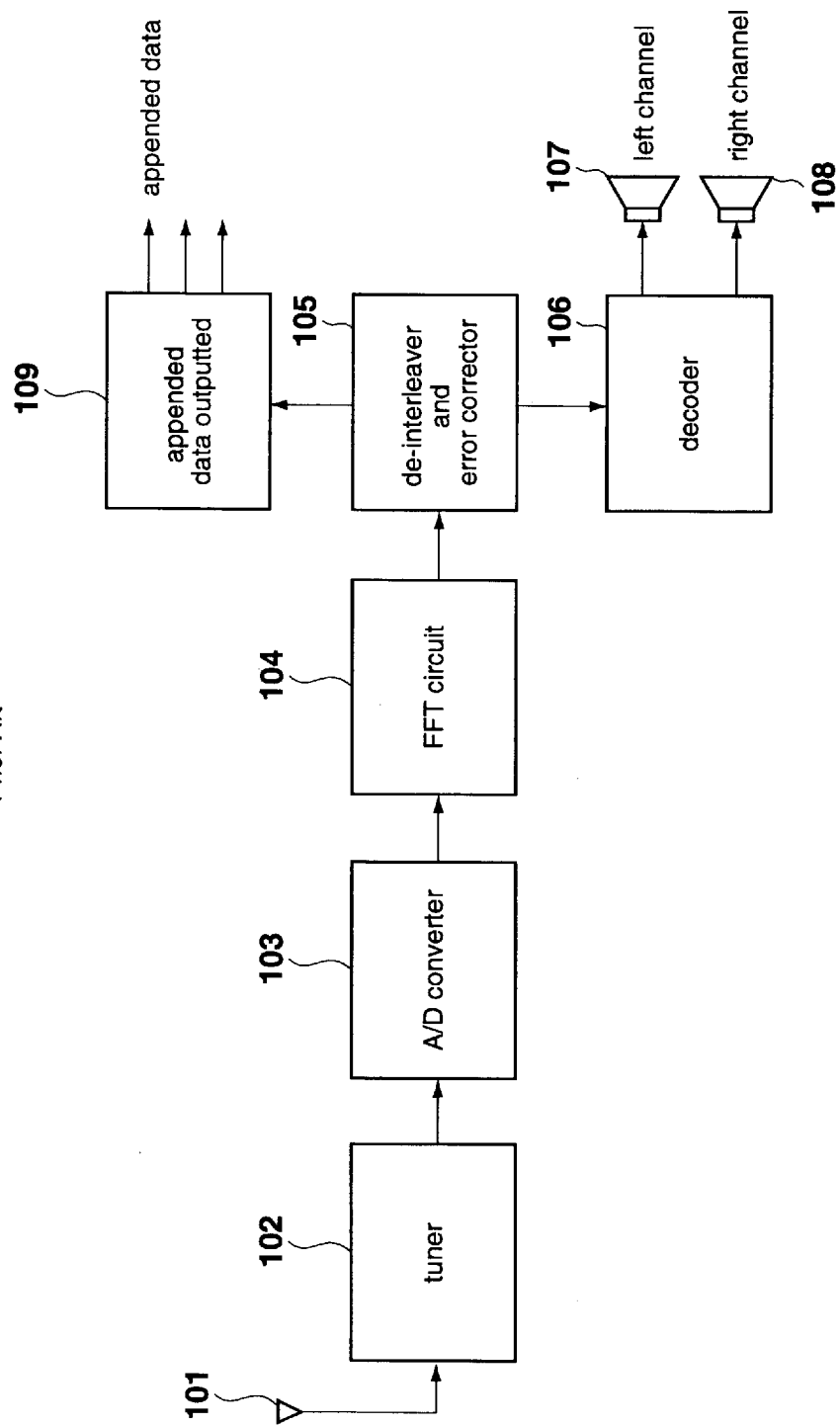
FIG. 1 is a block diagram showing an example configuration for a DAB receiving device.

In the above, a description has been given of the present invention applied to an FFT operation device but in addition to the DAB receiving device shown in FIG. 1, described, for example, above, this kind of FFT operation device can also be more widely applied to devices for carrying out digital signal processing. Further, the data taken as the object of the FFTs is by no means limited to audio data and can also be image signals or other digital signals.

In the above embodiments, the present invention has been described for the case of carrying out FFT processing but the present invention can also be applied to inverse FFT processing (inverse FFT processing can be carried out just by, for example, changing the rotational factor stored in the ROM 5(55) and the scope of the FFTs occurring in this specification can therefore be made to included inverse FFTs).

In these embodiments examples have been given for cases for radixes of 2 and 4 but the present invention can also be applied to other radixes.

In the embodiments in FIG. 5 etc., a configuration is adopted where the two outputs of the butterfly operator 4 are supplied to both the selector 13-0 and the selector 13-1. One or the other of the selectors 13-0 and 13-1 is then selected and data is supplied to the selector 14-0 or 14-1. Then, at the selector 14-0 or the selector 14-1, the output of the selector 13-0 or 13-1 is supplied to the memory 15-1 or 15-1 respectively or outputted as the final butterfly operation results. However, in addition to this, for example, a configuration can be adopted where the output of terminal out0 or out1 of the butterfly operator 4 is supplied to the selector 13-0 or the selector 13-1. Then, at selector 13-0 or 13-1, the output of the terminal out0 or out1 is supplied to both of the selectors 14-0 and 14-1 or outputted as the final butterfly operation results. Then, at the selectors 14-0 and 14-1, the output of one of either the selector 13-0 or selector 13-1 is selected and supplied to the memory 15-0 or the memory 15-1.

When the latter configuration is applied to, for example, the embodiments of FIG. 8 and FIG. 9 etc., the final butterfly operation results outputted from terminal out0 or out1 of the butterfly operator 4 can only be stored in the output buffers 32-0 and 32-1. It is therefore necessary to adopt the configuration (former configuration) described in the embodiments in order to store the final butterfly operation results outputted from the terminals out0 and out1 in neither the output buffer 32-0 or the output buffer 32-1.

According to the present invention, high-speed FFT operations can be carried out.

What is claimed is:

1. A fast Fourier transform operation device for carrying out fast Fourier transform operations or inverse fast Fourier transform operations by performing a butterfly operation a prescribed number of times, said device comprising a butterfly operator; a number of selectors each for receiving data and for selectively outputting the same; and at least one of a first storage part for storing data inputted to said butterfly operator a second storage part for temporarily storing data outputted from said butterfly operator and feeding-back read-out data to an input of said butterfly operator, and a third storage part for storing data that has undergone a butterfly operation a prescribed number of times, having a plurality of divided storage parts, wherein the butterfly operator, the number of selectors, and the at least one of first, second, and third storage parts are operable in accordance with a predetermined clock arrangement so as to satisfy one of (i) the butterfly operator and the number of selectors are operable in accordance with the same clock which is different from that of the at least one of first, second, and third storage parts; (ii) the number of selectors and the at least one of first, second, and third storage parts are operable in accordance with the same clock which is different from that of the butterfly operator; and (iii) the number of selectors and the at least one of first, second, and third storage parts are operable in accordance with the same clock.

2. A fast Fourier transform operation device according to claim 1, wherein the number of selectors include a first selector for allotting data inputted at said storage part to said plurality of divided storage parts, and a second selector for switching over between data outputted from said plurality of divided storage parts.

3. A fast Fourier transform operation device according to claim 2, wherein said storage part is divided into two divided storage parts, with writing and reading operations of said two divided storage parts being carried out using different timings.

4. A fast Fourier transform operation device according to claim 2, wherein said plurality of divided storage parts are partitioned by the same number as the radix of said butterfly operator.

5. A fast Fourier transform operation device according to claim 4, wherein said plurality of divided storage parts carry out data writing and reading operations simultaneously.

6. A fast Fourier transform operation device according to claim 5, wherein said plurality of divided storage parts is further partitioned into two, with writing and reading operations being carried out at different timings.

7. A fast Fourier transform operation method for carrying out fast Fourier transform operations or inverse fast Fourier transform operations, said method comprising the steps of performing a butterfly operation involving a butterfly operator a prescribed number of times; receiving data and selectively outputting the same by use of a number of selectors; and at least one of storing data inputted to said butterfly operator in a first storage part, temporarily storing data outputted from said butterfly operator and feeding-back read-out data to an input of said butterfly operator by use of a second storage part, and storing data having undergone a butterfly operation a prescribed number of times by use of a third storage part, in which the data is divided into a plurality of data with said divided data being stored at individual storage parts, wherein the butterfly operator; the number of selectors, and the at least one of first, second, and third storage parts are operable in accordance with a predetermined clock arrangement so as to satisfy one of (i) the butterfly operator and the number of selectors are operable in accordance with the same clock which is different from that of the at least one of first, second, and third storage parts; (ii) the number of selectors and the at least one of first, second, and third storage parts are operable in accordance with the same clock which is different from that of the butterfly operator; and (iii) the number of selectors and the at least one of first, second, and third storage parts are operable in accordance with the same clock.

8. A fast Fourier transform operation method according to claim 7, wherein said dividing is carried out in order to store to two storage parts and said two storage parts carry out reading and writing operations at different timings.

9. A fast Fourier transform operation method according to claim 7, wherein said dividing divides to the same number as the radix of said butterfly operator.

10. A fast Fourier transform operation method according to claim 9, wherein data divided by the same number as the radix of said butterfly operator is simultaneously written to and read from storage parts divided by the same number as said radix.

11. A fast Fourier transform operation method according to claim 10, wherein said storage part divided by the same number as the radix is further partitioned into two, with writing and reading operations being carried out at different timings.

* * * * *